US007337438B1

(12) United States Patent
Dobbins et al.

(10) Patent No.: US 7,337,438 B1
(45) Date of Patent: Feb. 26, 2008

(54) MACROS TO SUPPORT STRUCTURES FOR AN ASSEMBLER THAT DOES NOT SUPPORT STRUCTURES

(75) Inventors: Kris A. Dobbins, Goffstown, NH (US); David N. Swingle, Durham, NC (US)

(73) Assignee: Applied Micro Circuits Corporation, San Diego, CA (US)

( * ) Notice: Subject to any disclaimer, the term of this patent is extended or adjusted under 35 U.S.C. 154(b) by 590 days.

(21) Appl. No.: 10/404,901

(22) Filed: Mar. 31, 2003

(51) Int. Cl.
G06F 9/45 (2006.01)
(52) U.S. Cl. .................................... 717/141
(58) Field of Classification Search ........ 717/139–144, 717/106, 114, 120, 137, 159; 719/329; 703/22
See application file for complete search history.

(56) References Cited

U.S. PATENT DOCUMENTS

| 5,159,687 | A | * | 10/1992 | Richburg ..................... 717/106 |
| 5,293,629 | A | | 3/1994 | Conley et al. |
| 5,404,531 | A | * | 4/1995 | Wakatani ..................... 717/146 |
| 5,438,676 | A | * | 8/1995 | Schwanke ..................... 717/120 |
| 5,687,378 | A | | 11/1997 | Mulchandani et al. |
| 5,701,487 | A | | 12/1997 | Arbouzov |
| 5,768,564 | A | | 6/1998 | Andrews et al. ............ 395/500 |
| 5,842,204 | A | * | 11/1998 | Andrews et al. ............... 707/3 |
| 5,966,531 | A | * | 10/1999 | Skeen et al. ................. 719/315 |
| 5,999,733 | A | | 12/1999 | Shamoto ..................... 395/705 |
| 6,031,993 | A | | 2/2000 | Andrews et al. ............ 395/707 |
| 6,330,584 | B1 | | 12/2001 | Joffe et al. ................... 709/107 |
| 6,588,008 | B1 | | 7/2003 | Heddes et al. |
| 6,738,966 | B1 | | 5/2004 | Tanaka |
| 6,968,548 | B1 | | 11/2005 | Tabbert |
| 7,111,287 | B2 | | 9/2006 | Garvey et al. |
| 2001/0008023 | A1 | * | 7/2001 | Bond et al. ..................... 717/8 |
| 2002/0042849 | A1 | * | 4/2002 | Ho et al. ..................... 709/329 |
| 2003/0005418 | A1 | | 1/2003 | Sridhar et al. |
| 2003/0115574 | A1 | | 6/2003 | Garvey |
| 2003/0212672 | A1 | | 11/2003 | Meredith et al. |
| 2004/0010780 | A1 | * | 1/2004 | Garvin ......................... 717/143 |

(Continued)

OTHER PUBLICATIONS

Andries Van Dam et al. "Structured Programming In Assembly Language", Dec. 1976, ACM Press, ACM SIGCSE Bulletin, vol. 8, Issue 4, pp. 53-67.*

(Continued)

*Primary Examiner*—Wei Zhen
*Assistant Examiner*—Anna Deng
(74) *Attorney, Agent, or Firm*—Silicon Valley Patent Group LLP; Omkar Suryadevara

(57) ABSTRACT

An assembler incapable of supporting structures of the type supported in the "C" language receives and processes an assembly language program that contains one or more definitions of structures, structure instantiations and structure uses. Specifically, structure definitions are presented in the form of macro definitions. Moreover, a name to be used to identify the structure is passed as a parameter to the macro being defined (also called "structure-definition macro"). Furthermore, one or more members of a structure are presented in the form of arguments to a respective number of one or more macros that are invoked between the beginning and end of the structure-definition macro. During instantiation, variable names are created for each member of the structure, and these names are bound to appropriate addresses of resources. Thereafter, these variable names are used in the assembly language program to access data mapped to the member name.

11 Claims, 12 Drawing Sheets

U.S. PATENT DOCUMENTS

2004/0025148 A1* 2/2004 Krueger ............ 717/140
2004/0111248 A1* 6/2004 Granny et al. ........ 703/22
2004/0123276 A1 6/2004 Knueven et al.

OTHER PUBLICATIONS

Robert R. Leeper et al. "Structured Assembly Language in VAX-11 MACRO", Feb. 1986, ACM Press, ACM SIGCSE '86, vol. 18, Issue 1, p. 53-60.*
U.S. Appl. No. 10/404,228 by Kris A.Dobbins and David N. Swingle, filed on Mar. 31, 2003.
Office Action dated Jan. 26, 2006, in U.S. Appl. No. 10/404,228.
Amendment dated Apr. 25, 2006, in U.S. Appl. No. 10/404,228.
Office Action dated Jul. 27, 2006, in U.S. Appl. No. 10/404,228.
Amendment dated Sep. 8, 2006, in U.S. Appl. No. 10/404,228.
Office Action dated Nov. 17, 2006, in U.S. Appl. No. 10/404,228.
Amendment dated Feb. 13, 2007, in U.S. Appl. No. 10/404,228.
Office Action dated May 17, 2007, in U.S. Appl. No. 10/404,228.
Hyde, "The Art Of Assembly Language", 2000-2001 pp. 1-160.
Hyde, "Re: High Level Assemblers vs. High level language compilers," Mar. 2002 pp. 1-9.
Hyde, "Teaching Assembly Language Using HLA," Secure software Engineering & CodeBreakers-Journal, issue 8, 1998-2001 pp. 1-16.
Hyde, "Writing Linux Device Drivers in Assembly Language," Apr. 2002 pp. 3-6.
IBM, Automatic Generation of Assembler Language DSECTs to Match C Structures, NB9203395, published Mar. 1992 pp. 1-5.
Sitaker, "x86 assembly on Linus info," Apr. 2002 pp. 1-3.
"Assembly Language Specification," Nov. 2000 pp. 3-6.
"C Preprocessor Trick for Implementing Similar Data Types", Lars Wirzenius, Jan. 17, 2000 (9 pages).
Chapter 5, section 5.10 in book "ECE Computer Engineering II", Peter L.B.Johnson, Jan. 2003 (4 pages).

* cited by examiner

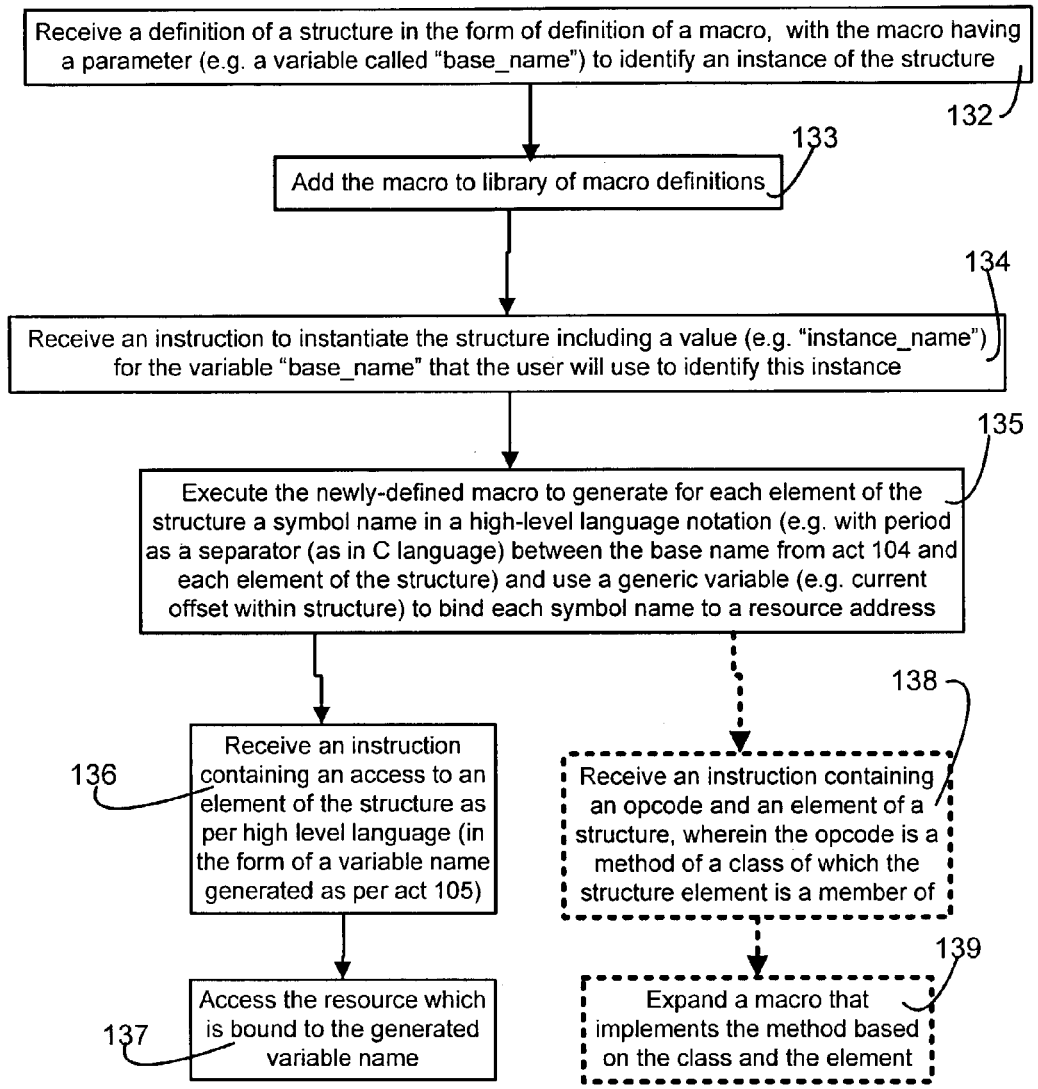

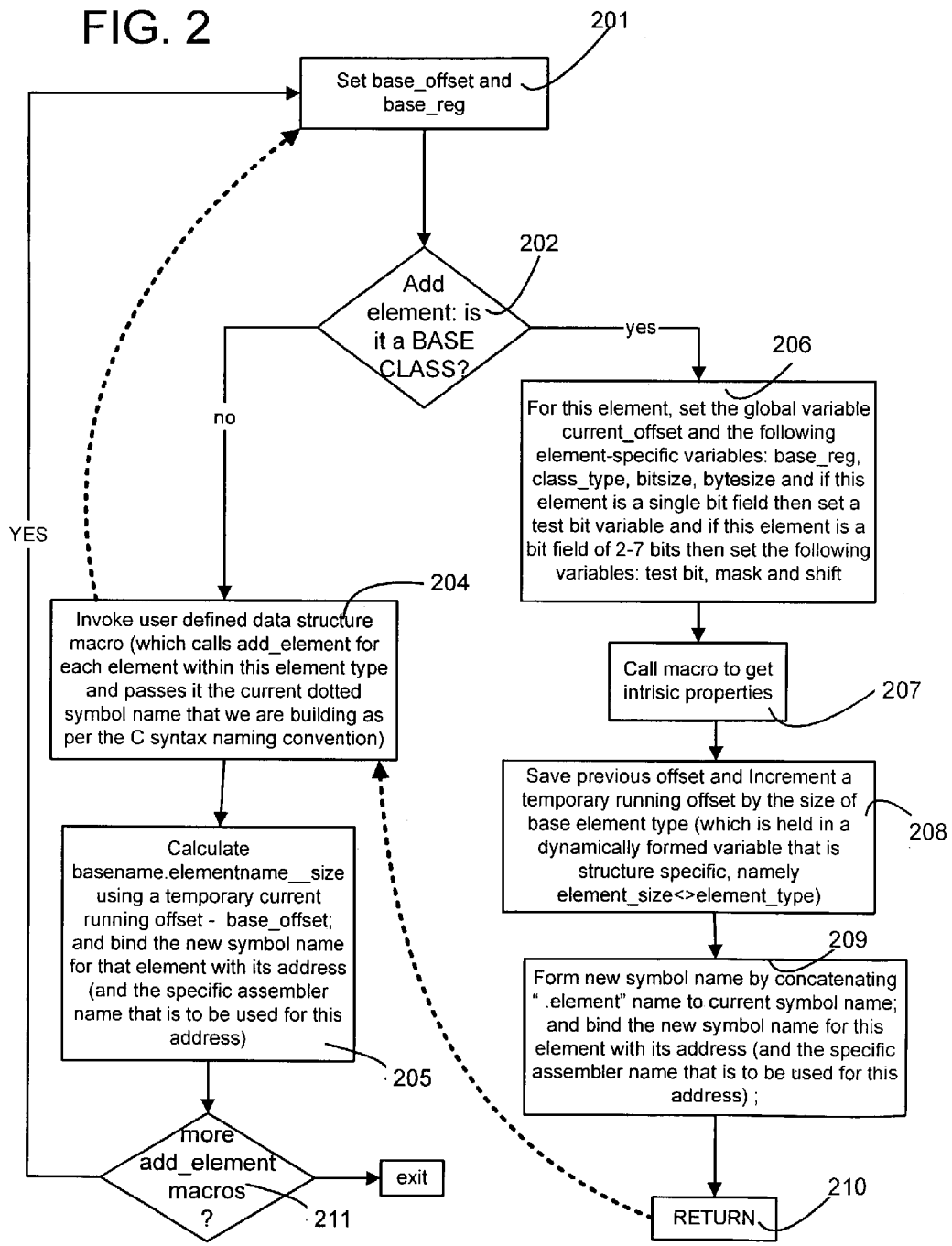

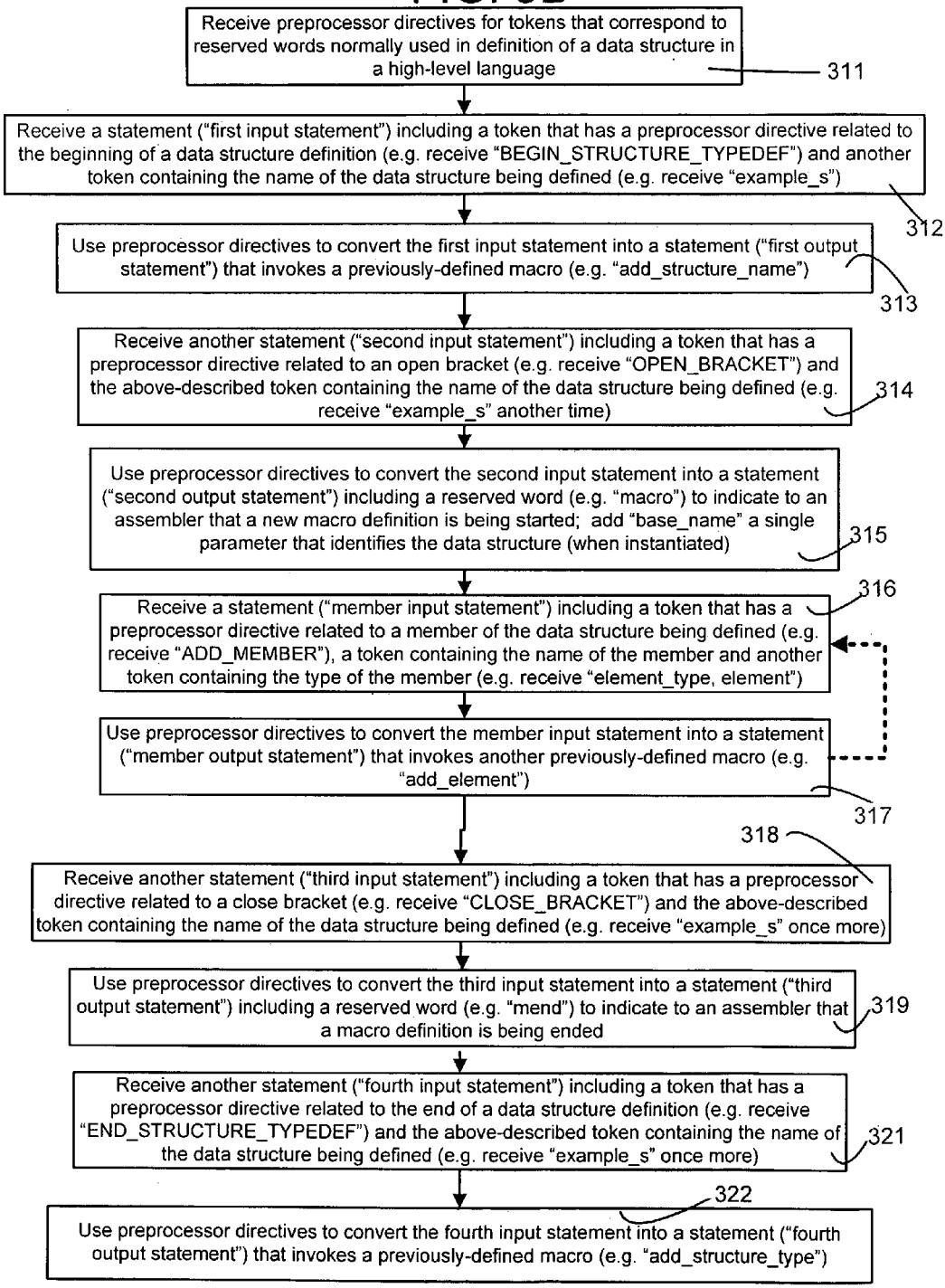

US 7,337,438 B1

MACROS TO SUPPORT STRUCTURES FOR AN ASSEMBLER THAT DOES NOT SUPPORT STRUCTURES

CROSS-REFERENCE TO RELATED APPLICATION

This application is related to and incorporates by reference herein in its entirety an application that is commonly owned, co-pending and concurrently filed by the same inventors and entitled "BINDING OF METHODS TO CLASSES DURING MACRO EXPANSION OF ASSEMBLY LANGUAGE PROGRAMS" having U.S. application Ser. No. 10/404,228.

CROSS-REFERENCE TO COMPUTER PROGRAM LISTING APPENDIX

Appendix A contains the following files in one CD-ROM (of which two identical copies are attached hereto), and is a part of the present disclosure and is incorporated by reference herein in its entirety.

```
Volume in drive D is 030331_1928
   Volume Serial Number is 159C-726F
   Directory of D:\
03/29/2003  02:15p        2,121 APPIASMI.TXT
03/29/2003  02:13p        3,804 ASMC2ASM.TXT
03/29/2003  02:13p        8,605 ASMC2OUT.TXT
03/29/2003  02:15p       30,329 ASMC2TCL.TXT
03/29/2003  02:15p        2,949 CLASSH.TXT
03/29/2003  02:58p    1,366,591 COMBOI.TXT
03/29/2003  02:15p    4,057,724 EPICLOG.TXT
03/31/2003  12:12p       29,230 PSEUDO.TXT
03/14/2003  11:55a       35,269 STRCASMH.TXT
03/14/2003  11:55a        2,111 STRUCTH.TXT
03/29/2003  02:14p        3,467 TEST.TXT
03/14/2003  11:55a       10,112 U16MASMH.TXT
03/14/2003  11:55a        6,994 U1MASMH.TXT
03/14/2003  11:55a       11,230 U32MASMH.TXT
03/14/2003  11:55a        9,770 U48MASMH.TXT
03/14/2003  11:56a       13,444 U64MASMH.TXT
03/14/2003  11:56a        8,042 U8MASMH.TXT
03/14/2003  11:56a        8,987 UXMASMH.TXT
           18 File(s)  5,610,779 bytes
            0 Dir(s)           0 bytes free
```

The files of Appendix A form source code and documentation for computer programs of an illustrative embodiment of the present invention.

The file ASM2ASM.TXT describes operation of a TCL/TK script in file ASMC2TCL.TXT that is executed prior to use of the assembler in accordance with the invention. The file ASMC2OUT.TXT is an output from applying the TCL/TK script to the input file APPIASMI.TXT (which contains example code including two structures defined in the manner described below).

The file CLASSH.TXT contains definitions of element types for implementing the size, and maps a variable's type to the appropriate method (via macro find_class_macro).

The file COMBOI.TXT contains application runtime code, including a number of macros such as loadi_hi32, loadi_lo32, pushreg, popreg, u8_t_xor, u16_t_move, u16_t_if, u16_t_shift u16_t_add and u16_t_addc).

The file STRUCTH.TXT (source file: 3400_db_macro.asmh) contains a definition of a structure for a register file, expressed in a predetermined format in accordance with the invention.

The file STRCASMH.TXT contains #define directives in the C language for each of a number of reserved words used in the file STRUCTH.TXT. This file STRCASMH.TXT also contains a number of predetermined macros (e.g. to bump current offset in structure define and also save previous offset, to define an element type, and to set a structure as being defined).

The files U1MASMH.TXT, U16MASMH.TXT, U32MASMH.TXT, U48MASMH.TXT, U64MASMH.TXT, U8MASMH.TXT, and UXMASMH.TXT contain methods for use with predetermined classes in accordance with the invention.

The file EPICLOG.TXT contains a listing from the assembler after C preprocessing, macro expansion and code generation by the assembler of all the above files.

The file PSEUDO.TXT contains pseudo-code and related documentation for one illustrative embodiment in accordance with the invention.

Assembly language programs of the type in the attached appendix can be used with a network processor assembler, version 3.0 available from AMCC of San Diego, Calif. Of note, this assembler supports concatenation of text strings, via the operator < >.

The executable object code generated by the AMCC assembler can be executed in any network processor available from AMCC. The executable object code can also be executed in a network processor simulator also available from AMCC with the simulator running on a Sun workstation under the Solaris operating system or on a IBM PC under the Windows NT operating system.

COPYRIGHT NOTICE

A portion of the disclosure of this patent document contains material that is subject to copyright protection. The copyright owner has no objection to the facsimile reproduction by anyone of the patent document or the patent disclosure, as it appears in the in the Patent and Trademark Office patent files or records, but otherwise reserves all copyright rights whatsoever.

CROSS-REFERENCE TO PAPER APPENDICES B AND C INCLUDED BELOW

Appendices B and C that are attached below just before the claims, provide documentation on how to use software in Appendix A in the attached CD-ROM. Appendices B and C are integral parts of the present disclosure and are incorporated by reference herein in their entirety.

BACKGROUND OF THE INVENTION

In networking applications, it is useful to be able to access data in using structures, for example as described in an article entitled "C Preprocessor Trick For Implementing Similar Data Types" by Lars Wirzenius dated 17 Jan. 2000, is available on the Internet at liw#iki#fi%liw%texts%cpp-trick#html (wherein "/" is replaced with "%" and wherein "." is replaced with "#", in order to comply with USPTO rule to avoid browser-executable code). This article is incorporated by reference herein in its entirety.

However, the support for structures provided in assembly language of a network processor is either non-existent or if present is likely to be very limited. For example, the NASM assembler does not support structures. However, NASM preprocessor is powerful enough to implement data structures using a set of macros (e.g. macros STRUC and ENDSTRUC may be used to define a structure data type) as described in Chapter 5 of a book entitled "ECE Computer Engineering II, January 2003 Laboratory Notes The ECE 291 Documentation Project" published by Department of Electrical and Computer Engineering University of Illinois at Urbana-Champaign, and Edited by Peter L. B. Johnson and available on the Internet at courses#ece#uiuc#edu%ece291%books%labmanual% index#html (wherein "/" is replaced with "%" and wherein "." is replaced with "#"). This reference is also incorporated by reference herein in its entirety.

In contrast, high level languages such as C provide support for handling a group of variables together using a common name, and accessing each variable individually using the "." operator. Pascal supports a similar construct which is known as a record. Note that the term "structure" as used in the C language should not be confused with the more generic term "data structure" which refers to any grouping of information such as an array or a linked list. Normally, every structure that is defined is given a name, and the variables that the structure contains (called members as per the C language) are also given names.

C language structures are easy to use. For example, you can assign one structure to another structure of the same type. In the C language, a union is like a structure in which all of the members are stored at the same address.

Although easy to use, the C language structures using the "." operator are not (to the inventor's knowledge) supported by an assembler for a network processor. Consequently, the effort required to prepare software (in assembly language) for execution by such network processors is significant.

SUMMARY

A computer programmed with an assembler for use in accordance with the invention is inherently incapable of supporting structures of the type supported in the "C" language. Therefore, a macro processor is used in accordance with the invention to receive and process an assembly language program that contains one or more definitions of structures, structure instantiations and structure uses. Specifically, structure definitions are presented, to a computer programmed with a macro processor in accordance with the invention, in the form of macro definitions, wherein a reserved word (e.g. "macro") that indicates the start of a macro and another reserved word (e.g. "mend") that indicates the end of the macro are respectively located before and after statements that define members of the structure. Moreover, a name to be used to identify the structure is passed as a parameter (e.g. "base_name") to the macro being defined (also called "structure-definition macro").

Furthermore, one or more members of a structure are presented in the form of arguments to a respective number of one or more macros (also called "member-definition" macros) that are to be invoked between the beginning and end of the structure-definition macro. Although each member-definition macro acts independently, each member-definition macro uses and/or updates one or more shared variables (e.g. current offset within the structure). Hence a series of invocation(s) of a member-definition macro act in concert to form the structure under definition.

After a structure has been defined (as noted above), the structure is instantiated by invoking the structure-definition macro with a string constant (e.g. "instance_name") to be used to refer to this instance of the structure. During instantiation, a number of variable names are created corresponding to each member of the structure. The variable names are created within the assembler (that is incapable of supporting structures) during execution of the structure-definition macro.

The variable names are created in a predetermined notation: the instantiated structure's name (e.g. "instance_name") followed by a separator (e.g. a dot namely ".") followed by the name of each member. After creation, each variable name is added to a symbol table in the assembler, and bound to an appropriate address of a resource that it represents. Thereafter, these variable names are used in the assembly language program in the normal manner, to access data within the member (e.g. identical to C language).

In certain embodiments, the structure-definition macro is programmed manually, although in other embodiments the structure-definition macro is automatically generated from other data provided by a programmer to define the structure. In one embodiment, the programmer defines the structure in C language using a typedef, and a tool (e.g. in the language Tcl/Tk) may be used to replace the typedef by the structure-definition macro. In another embodiment, the programmer defines the structure in certain predetermined words (called "reserved words") that extend the assembly language to provide support for C like syntax.

Furthermore, although only structures have been discussed above, unions of the type supported in the C language are also supported in some embodiments, in the manner discussed above except that the offset calculation is performed differently for unions.

BRIEF DESCRIPTION OF THE DRAWINGS

FIG. 1B illustrates, in a flow chart, acts performed by the macro assembler of FIG. 1A.

FIG. 2 illustrates, in a flow chart, acts performed by invocation of a macro (called "add element") for each member (also called "element") of a structure, during instantiation of the structure.

FIG. 3B illustrates, in a flow chart, acts performed by the C preprocessor of FIG. 3A.

DETAILED DESCRIPTION

Figure 1A:
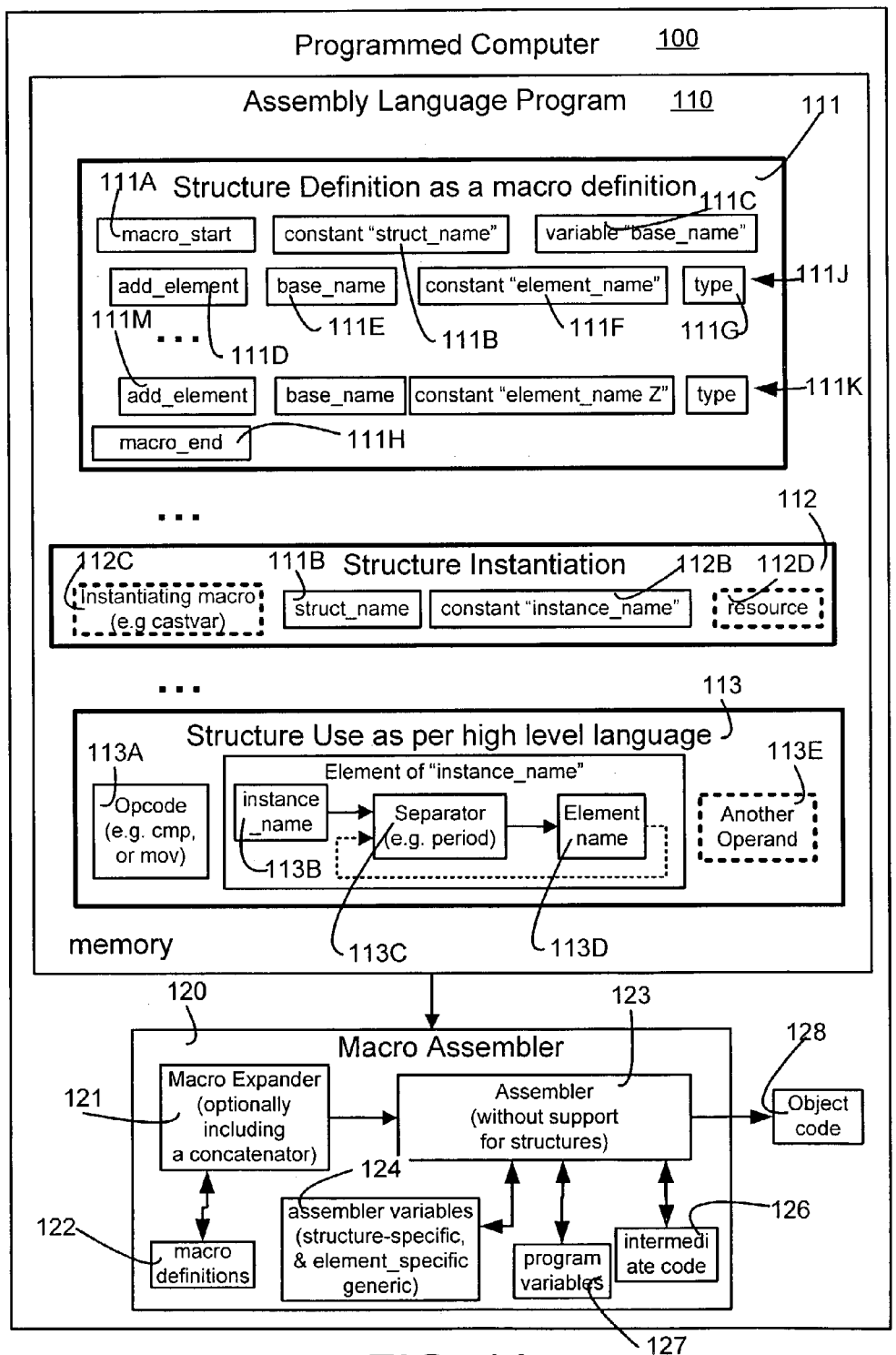
FIG. 1A illustrates, in a high-level block diagram, an assembly language program in accordance with the invention being supplied to a macro assembler that includes a macro processor and an assembler that does not support structures.

A computer 100 (FIG. 1A) that is programmed with an assembler 123 for use in accordance with the invention is inherently incapable of supporting structures of the type supported in the "C" language. Therefore, a macro processor 121 (FIG. 1A) is used in accordance with the invention to receive and process an assembly language program 110 that contains a structure definition 111 which is presented in the form of a macro definition. Specifically, structure definition 111 (FIG. 1A) contains a reserved word 111A (e.g. "macro_start") that indicates the start of a macro and another reserved word 111H (e.g. "macro_end") that indicates the end of the macro. Reserved words 111A and 111H sandwich (i.e. are located before and after) one or more statements 111J that define members of the structure.

As would be apparent to a skilled artisan, depending on the embodiment, a structure definition 111 of the type illustrated in FIG. 1A may include additional statements that precede and follow the start and end of a macro (i.e. before reserved word 111A and after reserved word 111H). For example, some embodiments have one or more statements preceding reserved word 111A which (a) check for errors (e.g. whether the about-to-be-defined structure was previously defined, and whether any previous structure definition remains incomplete) (b) initialize generic assembler variables (e.g. current offset within the structure and that structure definition is now active, and increment a unique identifier for each structure), and (c) initialize structure specific variables (e.g. synthesize a variable using the structure name and set the variable to the unique identifier).

In another example, several embodiments have one or more statements following reserved word 111H which (a) check for errors (b) identify the just-defined structure as a valid element type to permit nesting of this structure in any structure defined in future, and (c) compute the size of the structure being defined by the macro between words 111A and 111H. In alternative embodiments, such statements can be implemented within the macro being defined, e.g. as one of statements 111J and 111K that occur between reserved words 111A and 111H (FIG. 1A).

When preparing structure definition 111, care is taken to ensure that definition 111 supplies all the information necessary for macro assembler 120 to appropriately process each statement in definition 111. Note that the information that is necessary may change, depending on the embodiment. Specifically, in some embodiments when starting the macro, in addition to reserved word 111A it is also necessary to specify a name 111B that is to be used to identify the structure being defined, and a parameter 111C (also called "base_name" variable) that is to be used in future when specifying the name of an instance of this structure.

Furthermore, one or more members (also called "elements") of a structure are presented in the form of arguments to a respective number of one or more macros (such as macro 111D) that are to be invoked between the beginning reserved word 111A and end reserved word 111H of the structure-definition macro 111. Since statement 111J is executed independent of statement 111K, macro 111D acts independently of macro 111M. However, macros 111D and 111M use and/or update one or more assembler variables (e.g. current offset within the structure).

Such assembler variables that are updated may be specific (e.g. to a structure or element), or may be generic (i.e. not bound to any structure or element but useful to a structure or element currently being processed). Note that macro 111D and macro 111M may be identical to one another, or may be different (e.g. one may define an element and another may define another structure or a union). Use of such assembler variables (e.g. structure specific or generic variables) allows a series of invocation(s) of macro 111D (during execution of the entire macro 111) to act in concert (although acting independently), to form the structure under definition.

Therefore, macro 111 is received by computer 100 in an act 132 (FIG. 1B). Next, in act 133 (FIG. 1B), computer 100 (FIG. 1A) adds macro 111 to a library 122 of macro definitions. This library is used by a macro expander 121 (FIG. 1A) to expand any macros that are invoked in the assembly language program 110 (FIG. 1A). The invocation of a newly-added macro 111 (FIG. 1A) may happen in an act 134 (FIG. 1B), via an instruction in statement 112 (FIG. 1A) that instantiates the newly-defined structure 111 (FIG. 1A). Statement 112 include at a minimum, a name 111B that was used to identify the structure and a constant ("instance_name") 112B which is used by assembler 123 to identify the data held in the structure when macro 111 is instantiated.

In certain embodiments no additional information (other than structure name and name of an instance) is required to be supplied by a programmer for structure instantiation. In such embodiments, the assembler internally generates addresses of resources that are to be bound to the structure when instantiated. However, in other embodiments, instantiation of a structure requires the user to invoke a macro 112C (e.g. a cast_var macro as illustrated in the attached appendix), and macro 112C performs one or more housekeeping functions before invoking macro 111. Moreover, instantiation of a structure may also requires the user to supply an identity of a resource 112D (FIG. 1A) to be bound to the instance 112B. The assembler uses the identified resource's address to implement the binding as discussed next.

Specifically, in one embodiment, on receipt of an instruction to instantiate a structure, the programmed computer 100 (FIG. 1A) executes the newly-defined macro (as per act 135 in FIG. 1B), to generate for each element of structure 111B a symbol name (also called "variable name") in a high-level language notation (e.g. with period as a separator (as in C language) between the base name 112B from act 104 and the name of each element of the structure). The symbol names are created within assembler 120, during execution of macro 111. Also in act 135 (FIG. 1B), the programmed computer 100 uses a generic assembler variable (e.g. current offset within structure) to bind each generated symbol name to a resource address that was specified in instruction 112 (FIG. 1A).

Thereafter, the structure that has been instantiated can be used in assembly language program 110 in the normal manner, e.g. as in statement 113 (FIG. 1A). Specifically, in statement 113, the user specifies an opcode 113A, for example for a "mov" or "cmp" instruction, followed by a variable that is identical to the above-described generated symbol name (i.e. instance name 113B, followed by separator 113C, followed by element name 113D). Since this symbol name has been already defined (as per act 135 in FIG. 1B), use of the same symbol name in an instruction received in act 136 allows the identified resource to be accessed as per act 137 (FIG. 1B).

After act 135, it is possible to receive (in act 138) an instruction containing an opcode and an element of a structure, wherein the opcode is a method of a class of which the structure element is a member of. In certain embodiments, an act 139 is performed to expand a macro that implements the method based on the class and the element. Note that acts 138 and 139 are optional and are not performed in embodiments that do not provide support for object-oriented programming in assembly language (in which case acts 136 and 137 are performed as noted above).

Note that any character may be used as a separator (also called "member selection operator") instead of a period, depending on the embodiment. In certain embodiments, such a separator is a legal character for a symbol name that is supported by the assembler (e.g. the separator cannot be a reserved character); so instead of a period as a separator, a dash may be used (depends on the assembler).

In one embodiment, definition of a new structure includes invocation of a macro add_structure_name, followed by a macro definition for the new structure, followed by invocation of another macro add_structure_type. Each of macros add_structure_name and add_structure_type receive one argument, which is the new structure's name. In one example for which the source code is discussed below, the new structure's name 111B is "example_s."

Each of macros add_structure_name and add_structure_type perform error checking and set various generic assembler variables that are used by other macros to support the data structure being defined. Of note, the macro add_structure_type computes the size of the structure being defined and stores the computed size in a variable that may be accessed in future, e.g. if a programmer is about to allocate a block of memory for this structure, the programmer obtains the size to be allocated from this variable.

In one implementation, macro add_structure_name checks to make sure that the data structure being defined hasn't already been defined, by checking for the existence of a structure-specific assembler variable such as "struct_example_s" is already defined. Note that this assembler variable is obtained by concatenating the new structure's name "example_s" to the predetermined string "struct_". In one embodiment that is illustrated in the attached software appendix, macro add_structure_name is written in a generic fashion (i.e. instead of assembler variable "struct_example_s" that contains the name "example_s" of the new data structure, a variable (e.g. "name") is used (so that "struct_example_s" is actually "struct_name") and the variable is substituted with a constant "example_s" at macro expansion time). If the just-described assembler variable struct_example_s is already defined then an error message is generated and the assembly process is halted.

In this implementation, macro add_structure_name also checks to make sure that any previous data structure definition is completed, by checking for a generic assembler variable namely "nPk_begin_struct_active." Note that the string "nPk" is used to identify this variable as being a generic assembler variable that is used in the macro expansion process. If variable "nPk_begin_struct_active" is true then again an error message is generated and the assembly process is halted.

If up to this stage there have been no errors then macro add_structure_name initializes the variable "nPk_begin_struct_active" to active, and also initializes to zero a generic assembler variable nPk_struct_current_off that defines the current offset within the current structure, and initializes to zero yet another generic assembler variable nPk_struct_previous_off that defines the previous value of the offset within the current structure. At this stage, macro add_structure_name also increments a generic assembler variable nPk_structures which indicates the total number of structures defined so far.

The just-described variable nPk_structures is also used to generate a unique identifier for each structure, as follows. Specifically, macro add_structure_name initializes a variable that is specific to the structure being defined, namely the above-described variable struct_example_s is set to be equal to the variable nPk_structures. This statement ensures that if an attempt is made in future to define the same structure again, variable struct_example_s is already defined and exists so that the attempt will fail.

An example of source code for a structure definition 111 is shown below. In this example, the new structure's name 111B is "example_s." Also in this example, parameter 111C that specifies the name of a variable of an instance of this new structure, is the variable "base_name." Moreover, in the following example, the reserved word 111*a* is "macro" and the reserved word 111*h* is "mend". Also, each member of the structure is defined by invocation of a macro add_element which receives three arguments: parameter 111C (in this example "base_name"), element name 111F (e.g. byte_var, word_var and struct_var), and type (e.g. u8_t which represents unsigned byte, u16_t which represents unsigned integer, and demo_s which represents a previously-defined structure). In this example, a structure definition 111 preceded and followed by the macros add_structure_name and add_structure_type respectively is written as follows:

```
add_structure_name example_s
macro example_s, base_name
add_element base_name, byte_var, u8_t
add_element base_name, word_var, u16_t
add_element base_name, struct_var, demo_s
add_element base_name, dword_var, u32_t
mend
add_structure_type example_s
```

Although only structures have been discussed above, unions of the type supported in the C language are also supported in some embodiments, in the manner discussed above for structures except that the offset calculation is performed differently for unions. An example of the type discussed above in which a structure definition 111 is preceded and followed by the macros add_structure_name and add_structure_type and which includes a union construct is as follows:

```
add_structure_name example_s
macro example_s, base_name
add_element base_name, byte_var, u8_t
add_element base_name, word_var, u16_t
add_element base_name, struct_var, demo_s
begin_union example_u
add_union_element example_u, base_name, union_byte_var, u8_t
add_union_element example_u, base_name, union_word_var, u16_t
end_union example_u
add_element base_name, dword_var, u32_t
mend
add_structure_type example_s
```

Macro begin_union checks if a generic assembler variable union_name_active is defined and if it is set to the value 1. Note that the italicized portion union_name is substituted with the actual name of the union, which in the above source code is "example_u". If this variable is defined and also set to 1, then an error message is generated telling the programmer that he/she cannot have nested unions of same name, and the assembly process is halted. If this variable is not true, then the following initializations of generic assembler variables are made:

union_name_base_offset=nPk_struct_current_off;

union_name_active=1;

union_name_max_offset=0;

Macro add_union_element receives the following arguments: union_name, base_name, element_name, element_type. Macro add_union_element also checks if the above-described generic assembler variable union_name_active is defined but this macro checks it is set to the value 0. If so, then an error message is generated telling the programmer that he/she cannot invoke the macro add_union without first invoking the macro begin_union. Next, macro add_union_element sets the generic assembler variable nPk_struct_current_off to the value in the variable union_name_base_offset (which was set by macro begin_union). Then macro add_union_element invokes the macro add_element. After the element has been added, by macro add_element, this macro updates the generic assembler variable nPk_struct_current_off, and so macro add_union_element computes the following temporary variable tmp_off, and uses this variable to reset a maximum offset variable that is specific to this union, namely example_u_max_offset (note that in the following the italicized text is replaced by the union name at macro expansion time):

```
tmp_off = (nPk_struct_current_off - union_name_base_offset);
    if (tmp_off > union_name_max_offset)
    {
    union_name_max_offset = tmp_off;
    }
```

The maximum offset variable indicates the maximum size of the union—and this variable is used by the macro end_union to calculate the location where the next element in the structure may begin (by updating the generic assembler variable nPk_struct_current_off), as follows:

nPk_struct_current_off=union_name_base_offset+
union_name_max_offset;
union_name_active=0;

As shown above, macro end_union also sets the a generic assembler variable union_name_active to 0 so that another definition of a union may begin. Referring back to the above two examples of source code for structure definition 111, as noted above in each example this source code is followed by the macro add_structure_type which is discussed next. Specifically, macro add_structure_type sets a generic assembler variable element_type_struct_name to 1, increments the variable nPk_element_types, and sets to zero the three generic assembler variables struct_name_overlay_active=0, nPk_begin_struct_active and nPk_struct_current_off.

Thereafter, macro add_structure_type forces the macro for structure 111 to be invoked. This invocation allocates the name struct_name to structure 111 at a location r0 (which is the very first location) in a register file and assigns it the variable name dummy. Specifically, this structure 111 is allocated with no offset from the specified location r0. Furthermore, since the base address is a register location, the base address is converted to register file offset as follows:

nPk_structure_base_reg=
(((nPk_structure_base_reg-this_is_a_reg_r0)*8)+1);

Thereafter, macro add_structure_type initialize to zero the above described generic assembler variables nPk_struct_current_off and nPk_struct_previous_off, and then invoke the macro 111 by using the structure name as an opcode and a variable name is passed as a parameter as follows:
struct_name dummy;

Thereafter, macro add_structure_type sets variable size in a temporary variable dummy_size to a size in number of bits of the structure 111, from the generic assembler variable nPk_struct_current_off, and then converts the size into bytes and rounds up any fractional amount to nearest byte. The size of the structure in bytes is then saved in a structure specific variable, namely struct_name_bytesize. The size of the element that was just defined is also saved in another structure specific variable, namely element_size_struct_name.

In the two examples noted above, all macros have been described so far except for the add_element macro which is described next in reference to FIG. 2. Specifically, macro add_element initially sets (as per act 201) structure specific variables base_offset and base_reg from the corresponding generic assembler variables nPk_struct_current_off and nPk_structure_base_reg. Variable base_offset indicates an offset (in number of bits) relative to the beginning of the structure, and variable base_reg indicates the location in a register file of the current resource address.

Next, a check is done in act 202 as to whether or not the current element to be added is a base class (in which case it is not a structure and therefore no further recursion is necessary through the add_element macro). If the answer is no, then act 204 is performed wherein a structure (hereinafter "current structure") being added in the current cycle of the add_element macro is parsed to identify each individual element therein, and one or more structure-definition macros are invoked for each element in the current structure. When invoking each structure-definition macro, an argument is passed thereto, identifying the name to be associated with the instance. This argument is created by concatenation of characters/strings in act 204: the current structure's name followed by period followed by element name.

Note that at this stage, since the structure-definition macro is defined in terms of the macro add_element, control jumps to act 201 but with a new current structure (which is an element in the previous current structure). If there are a number of nested structures, then macro add_element is repeatedly called, until an element is found that returns a true to the check in act 202. After processing of acts 206-210 (which are described below), control returns to a location in the previous invocation of the add_element macro from which the current cycle was reached.

After such a return from the recursive add_element macro call in act 204, an offset within the current structure is normally updated except if the element is a union in which case the address is set to previous (i.e. frozen) until the end of the union. This ensures that all members of the union map to the same address, so as to act as an overlay. On completion of processing of all elements in the current structure, control is transferred to act 205 which is discussed next.

Specifically, in act 205, macro add_element calculates the value of basename.elementname_size as the size of the current structure as a whole (which happens to be the "element" being added by macro add_element), using a temporary current running offset namely base_offset. Moreover, macro add_element also binds a new symbol name for the current element with its address and a specific assembler name that is to be used for this address. After processing in act 205 is completed, control returns to act 201 if there are additional add_element macro invocations to be processed (as per act 211). If there are no additional add_element macro invocations, then in act 211, this macro exits.

As noted above, if the element being processed is of a base class, then control transfers to act 206 wherein several generic assembler variables are set for this element: base_reg, class_type, bitsize, current_offset. Thereafter, in act 207 a macro set_op_reg is called to obtain properties that are intrinsic to the resource to which this element is being mapped. Class_type identifies a class that the element belongs to; bitsize is the size in bits of the element (not necessarily for a bit field because structure can have bit fields, the size is calculated in bits and then it is converted to bytes).

Depending on the element, other properties that may be set include, for example, a "test bit" variable which contains an offset bit to be used in bit test, and a "jump instructions mask" variable which is used identify the location of the multiple bits in a bit field in a byte; and a "shift" variable which is used to byte align the bit field. Note that in certain network processor architectures, an offset of the "test bit" is different for different registers (such as register file, channel register and task register): where the bit is located (offset) within register files is byte relative but in channel and task registers the location is 32-bit relative.

Such properties are used (e.g. variable name, base_reg and base_offset) to determine for a structure_name.element_name, an appropriate resource address (based on the resource) that is recognized by the assembler.

Next, in act 208, macro add_element saves the current offset as the previous offset and increment a temporary running offset by the size of base element type (which is held in a structure specific variable namely element_size_element_type). For example, macro add_element may add 8 bits to current offset size when the element is a byte. Macro add_element keeps track of this size while inside a structure so it can assign a size to embedded structures even if there are user-defined variable size nested structures.

Thereafter, in act 209, macro add_element forms new symbol name by concatenating ".element" name to current symbol name and binds the new symbol name for this element with its register address and the specific assembler name that is to be used for this address. Next, in act 210, macro add_element performs a return so that control transfers back to a macro that called this current cycle of add_element macro.

Figure 3A:
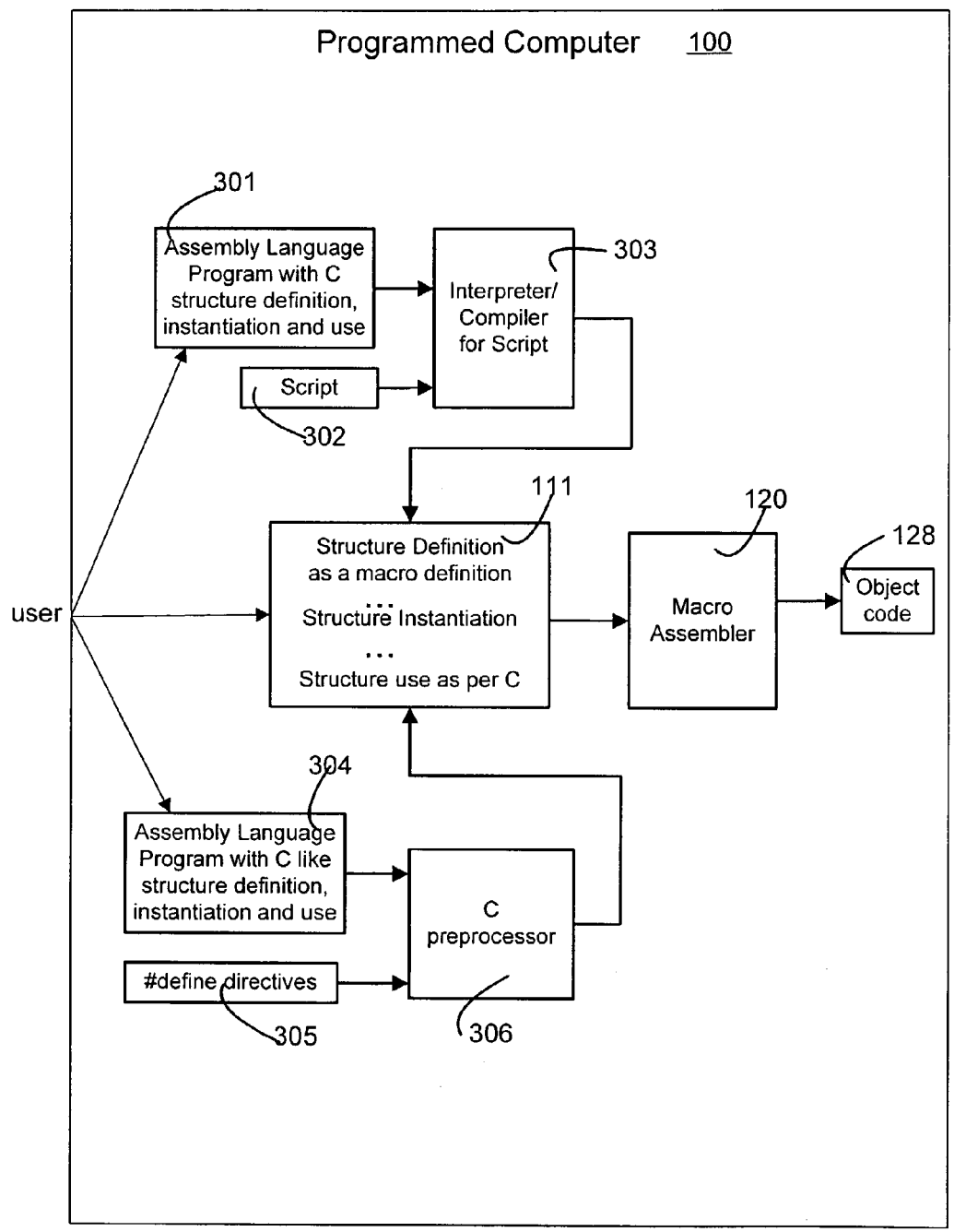
FIG. 3A illustrates, in a high-level block diagram, two ways to automatically generate an assembly language program containing a structure definition in the form of a macro definition illustrated in FIG. 1A.

In certain embodiments, the above-described macro (also called structure-definition macro) 111 is programmed manually by the user, although in other embodiments macro 111 is automatically generated from data provided by a user to define the structure. In one embodiment, the user defines the structure in the standard C language using a typedef as a part of the assembly language program 301 (FIG. 3A). For the above described second example of source code, the user may supply the following:

```
typedef example_s {
    u8_t byte_var;
    u16_t word_var;
    demo_s struct_var;
    union example_u {
        u8_t union_byte_var;
        u16_t union_word_var;
    };
    u32_t dword_var;
};
```

Thereafter a script 302 (e.g. in the language Tcl/Tk) may be used with an appropriate interpreter or compiler 303, to replace the typedef in program 301 so as to obtain macro 111 that is then provided to the macro assembler 120 in the manner described above.

In another embodiment, the user defines the structure in certain predetermined words (called "reserved words") that extend the assembly language to provide support for C like syntax. The C like syntax is shown below for the above described second example of source code, wherein the user may supply the following:

```
BEGIN_STRUCTURE_TYPEDEF (example_s)
OPEN_BRACKET (example_s)
ADD_MEMBER (u8_t, byte_var)
ADD_MEMBER (u16_t, word_var)
ADD_MEMBER (demo_s, struct_var)
BEGIN_UNION (example_u)
ADD_UNION_MEMBER (example_u, u8_t, union_byte_var)
ADD_UNION_MEMBER (example_u, u16_t, union_word_var)
END_UNION (example_u)
ADD_MEMBER (u32_t, dword_var)
CLOSE_BRACKET (example_s)
END_STRUCTURE_TYPEDEF (example_s)
```

In such an embodiment, the user generates an assembly language program 304 which contains one or more C like structure definition(s) that are converted by a C preprocessor 306 (also called CPP) in accordance with a number of directives into macro definition 111.

Figure 3C:
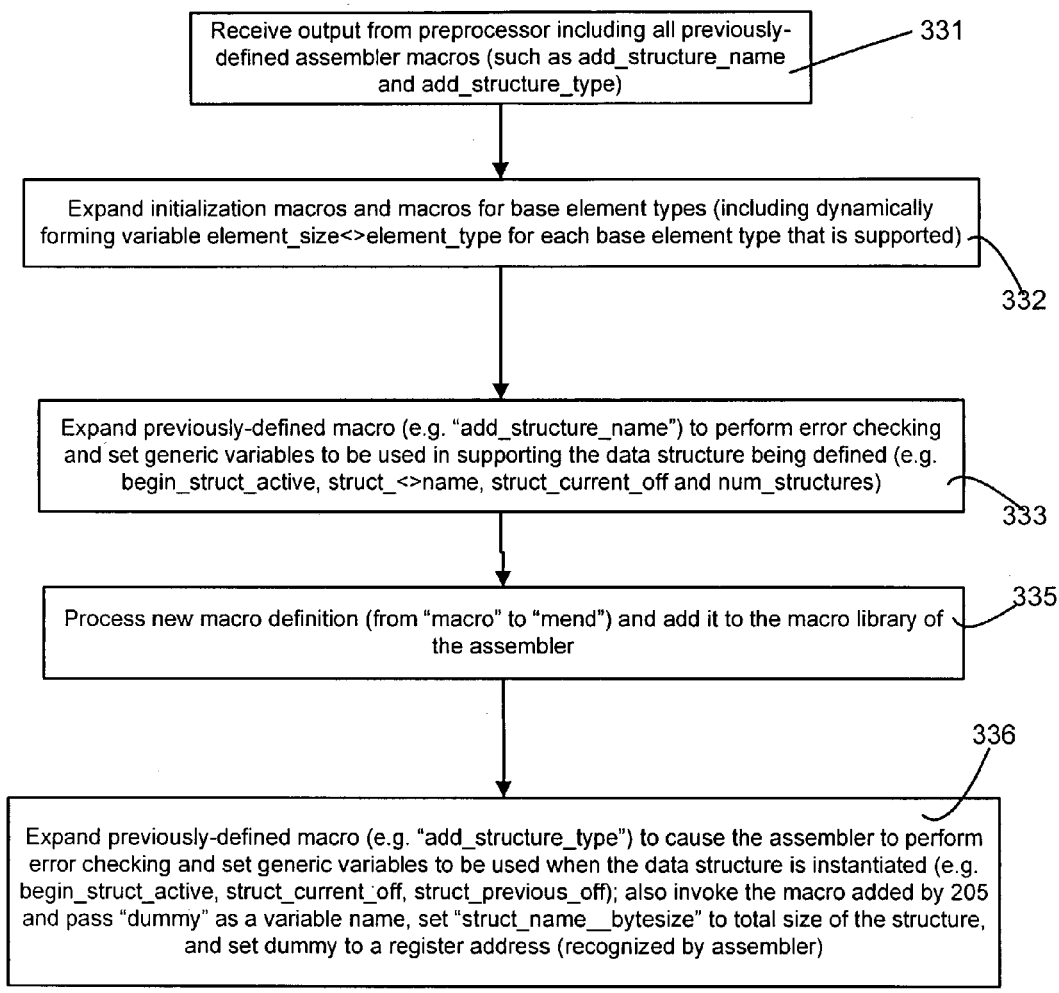
FIG. 3C illustrates, in a flow chart, acts performed by a macro expander to expand one or macros added by the C preprocessor when performing the acts of FIG. 3B.
Figure 3D:
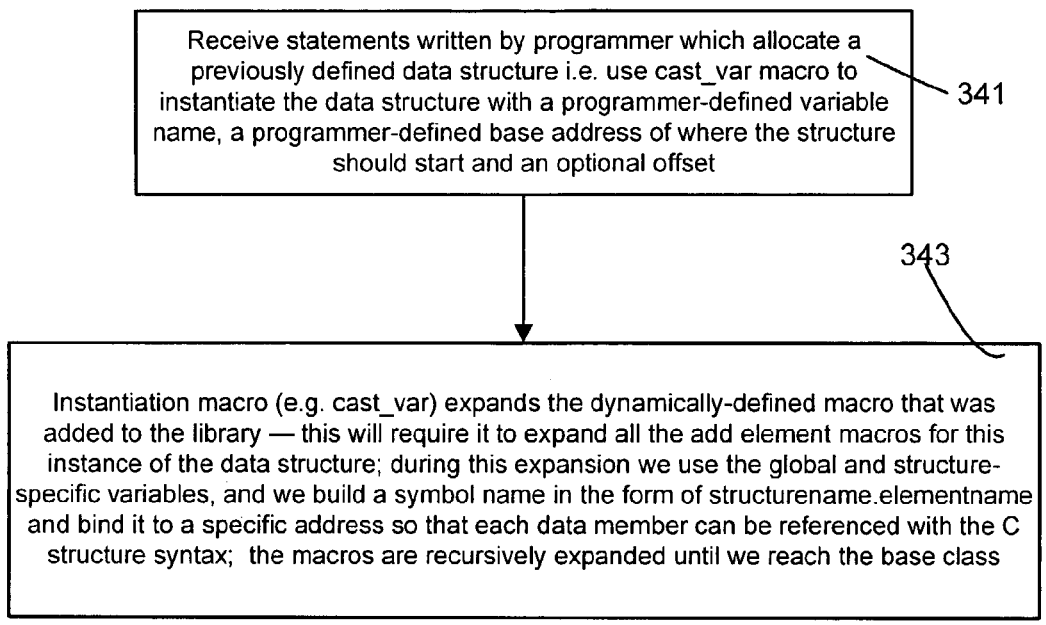
FIG. 3D illustrates, in a flow chart, acts performed by an assembler in accordance with the invention.

As shown above, each token of a typedef construct in the C language may have a corresponding #define that is predefined e.g. BEGIN_STRUCTURE_TYPEDEF, OPEN_BRACKET, CLOSE_BRACKET, and END_STRUCTURE_TYPEDEF. Such predefined macros may be implemented as just #define directives to the CPP. In the above described embodiment the acts performed by CPP are illustrated in FIG. 3B, and acts performed by a macro expander are illustrated in FIG. 3C and execution of the resulting assembler code is illustrated in FIG. 3D all of which are described next.

Specifically, in act 311, C preprocessor 306 receives preprocessor directives for tokens that correspond to reserved words normally used in definition of a C like structure in a high-level language, and converts them into macros as discussed below.

Next, in act 312, CPP receives at least one statement ("first input statement") which includes a token that has a preprocessor directive related to the beginning of a data structure definition (e.g. receive "BEGIN_STRUCTURE_TYPEDEF") and another token containing the name of the data structure being defined (e.g. receive "example_s"). In response, in act 313, CPP uses preprocessor directives to convert the first input statement into a statement ("first output statement") that invokes a previously-defined macro (e.g. "add_structure_name").

Thereafter, in act 314, CPP receives another statement ("second input statement") including a token that has a preprocessor directive related to an open bracket (e.g. receive "OPEN_BRACKET") and the above-described token containing the name of the data structure being defined (e.g. receive "example_s" another time). CPP responds in act 315 by using preprocessor directives to convert the second input statement into a statement ("second output statement") including a reserved word (e.g. "macro") to indicate to an assembler that a new macro definition is being started; add "base_name" a single parameter that identifies the data structure (when instantiated).

Next, in act 316, CPP receives another statement ("member input statement") including a token that has a preprocessor directive related to a member of the data structure being defined (e.g. receive "ADD_MEMBER"), a token containing the name of the member and another token containing the type of the member (e.g. receive "element_type, element"). In response, in act 317, CPP uses preprocessor directives to convert the member input statement into a statement ("member output statement") that invokes another previously-defined macro (e.g. "add_element").

Thereafter, CPP receives in act 318, another statement ("third input statement") including a token that has a preprocessor directive related to a close bracket (e.g. receive "CLOSE_BRACKET") and the above-described token containing the name of the data structure being defined (e.g. receive "example_s" once more). CPP responds in act 319 by using preprocessor directives to convert the third input statement into a statement ("third output statement") including a reserved word (e.g. "mend") to indicate to an assembler that a macro definition is being ended.

Finally, in act 321, CPP receives another statement ("fourth input statement") including a token that has a preprocessor directive related to the end of a data structure definition (e.g. receive "END_STRUCTURE_TYPEDEF") and the above-described token containing the name of the data structure being defined (e.g. receive "example_s" once more). In response, CPP uses preprocessor directives in act 322 to convert the fourth input statement into a statement ("fourth output statement") that invokes a previously-defined macro (e.g. "add_structure_type").

In some embodiments, the output from CPP is processed by a macro expander (hereinafter simply MXP) that is a portion of an assembler (called macro assembler) as illustrated in FIG. 3C. Specifically, as per act 331, the MXP receives output from preprocessor including all previously-defined assembler macros (such as add_structure_name and add_structure_type). Then in act 332, the MXP expands a number of initialization macros and macros for base element types (and in this stage MXP also dynamically forms variables by concatenation of, for example the constant "element_size" with a variable of name "element_type" for each base element type that is supported).

Next, in act 333, MXP expands a previously-defined macro (e.g. "add_structure_name") to perform error checking and set generic assembler variables to be used in supporting the data structure being defined (e.g. begin_struct_active, struct_name, struct_current_off and num_structures). Thereafter, in act 334, MXP processes the new macro definition (defined between "macro" and "mend") and adds it to the macro library of the assembler.

Note that such a macro definition need not in fact be used as discussed next (the usage depends on whether or not a particular assembly language program needs to access such a structure). In act 336, MXP expands previously-defined macro (e.g. "add_structure_type") to cause the assembler to perform error checking and set generic assembler variables to be used when the data structure is instantiated (e.g. begin_struct_active, struct_current_off, struct_previous_off); also invoke the macro added by 335 and passes "dummy" as a variable name, sets "struct_name_bytesize" to total size of the structure, and sets dummy to a register address (recognized by assembler). As noted elsewhere, programmers may want to know the size of a structure to be allocated to a resource (which is now stored in struct_name_bytesize), before the allocation is in fact performed.

Regarding what an assembler may do in such embodiments, see FIG. 3D. Specifically, in act 341, the assembler receive statements written by programmer which allocate a previously defined structure. For example, a programmer may use a cast_var macro (described below) to instantiate the structure with a programmer-defined variable name, a programmer-defined base address of where the structure should start and an optional offset.

Specifically, cast_var macro invokes a structure-defining macro that was added to the library—this will require it to expand all the add element macros for this instance of the structure; during this expansion the assembler uses the generic and structure-specific variables, and builds a symbol name in the form of structurename.elementname and binds it to a specific address so that each data member can be referenced with the C structure syntax; the macros are recursively expanded (as noted above) until the assembler reaches a base class. Note that there is no explicit limit on the number of levels of nesting of a structure, except that the assembler may have a problem of memory being insufficient (depending on the platform on which the assembler is executing).

Figure 4A:
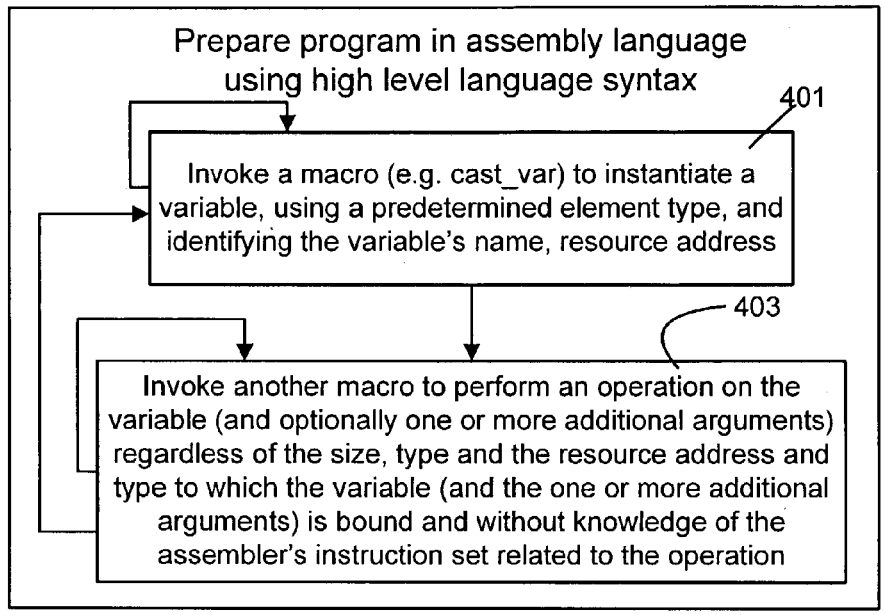
FIG. 4A illustrates, in a high level flow chart, acts performed by a programmer in using a high level language syntax when creating a program in assembly language.

In certain embodiments, as illustrated by act 401 in FIG. 4A, the programmer invokes a macro (e.g. cast_var) to instantiate a variable (as discussed above in reference to act 343 of FIG. 3D), using a predetermined element type, and identifying the variable's name, as well as the address of a resource (such as register or memory) to which the variable is bound. The size and resource type are automatically determined from assembler variables (e.g. by macro add_element) during expansion of a macro that is invoked by macro cast_var. Note that act 401 in FIG. 4A may be repeated any number of times, to instantiate any number of variables that the programmer is using in their program.

Next, the programmer performs act 403 to specify an operation to be performed on the variable. Specifically, the programmer invokes another macro to perform an operation on the variable (and optionally one or more additional arguments). In invoking the macro, the programmer is unaware of the size, type and the resource address(es) and type(s) to which the variable and the one or more additional arguments are bound. The programmer may also not have any knowledge of the assembler's instruction set that is related to the operation that is to be performed. Note that act 403 may be repeated any number of times for any variable that has already been instantiated (as per act 401). If act 403 is performed on a variable without instantiation of the variable by performing act 401, then an error message will be generated.

Note that in act 403, because the programmer can be unaware of the one or more assembler's instructions that are related to the operation network processors, the issues mentioned above in the Background section are eliminated when preparing assembly language programs in accordance with the invention.

Figure 4B:
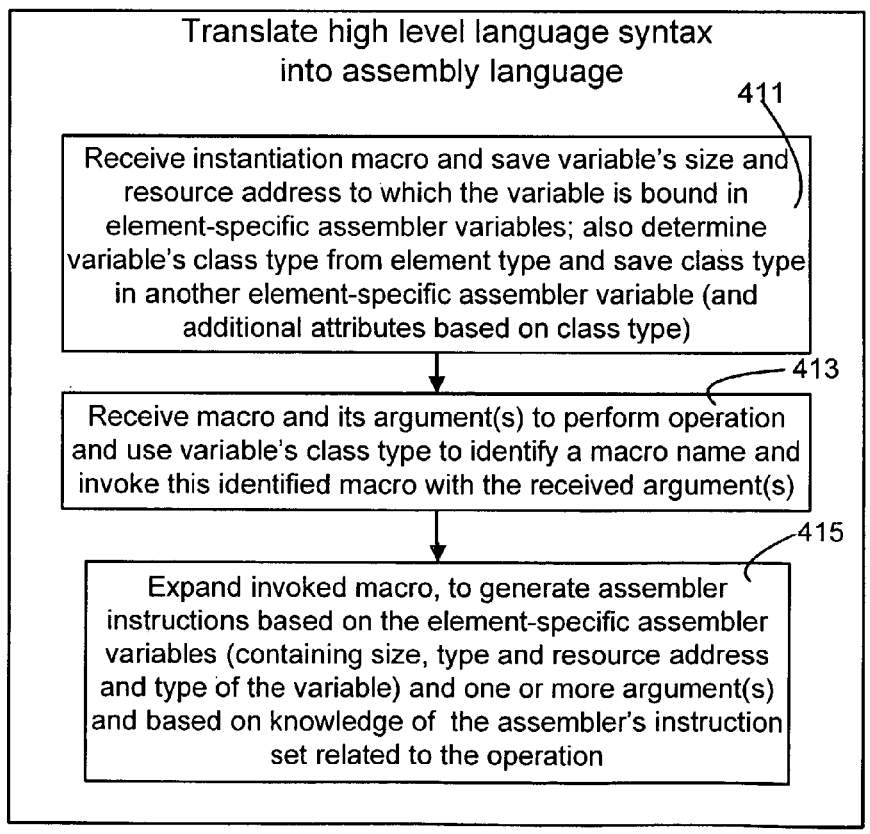
FIG. 4B illustrates, in a high level flow chart, acts performed by a macro expander to process a program that is generated by the acts illustrated in FIG. 4A.

The program generated by the programmer is then processed by a macro expander, as per acts 411-415 illustrated in FIG. 4B, to translate the high level language syntax used by the programmer (including use of any macros) into assembly language instructions that are provided to the assembler as described herein. Specifically, as illustrated by act 411 (FIG. 4B), the macro expander receives from the user's program an indication that the instantiation macro is to be invoked, which is done at this stage. In act 411, the macro expander saves the variable's size and resource address to which the variable is bound in one or more element-specific assembler variables that will be used later. Also in act 411, the macro expander determines the variable's class type from element type and saves class type in another element-specific assembler variable.

In addition, in act 411, additional information may be saved, such as Bitfield, bit test, bit off, shift, etc. as needed. The additional information that is saved may depend on one or more attributes of the variable, such as whether or not the variable is a multi-bit (or single bit) field.

Note that although in some embodiments described herein, support is provided for multiple types (class type and element type for example), it is possible for other embodiments to have only one type. In such other embodiments, the element type may be used directly (instead of its use through the class type) to identify a macro to be invoked to perform an operation identified by the user.

Next, in act 413, the macro expander receives a macro and its argument(s) specifying an operation to be performed. Therefore, in act 413, the macro expander uses the variable's class type to identify a macro name and invokes this identified macro with the argument(s) that were received in act 413. Note that instead of or in addition to the variable's class type, a macro expander may take into account one or more other attributes of the variable and/or other operand (depending on the architecture and/or embodiment).

Next, in act 415, the macro expander performs its normal function of expanding the invoked macro, to generate assembler instructions. The assembler instructions that are generated in act 415 may be based on the element-specific assembler variables (containing size, type and resource address(es) and type(s) of the variable and one or more argument(s)) and/or based on knowledge of the assembler's instruction set related to the operation.

Note that act 413 may be performed in any manner that will be apparent to the skilled artisan in view of the disclosure. For example if a macro assembler allows storage and usage of arrays, a table lookup may be performed to identify the appropriate macro to be invoked. In some other embodiments, the macro's name is identified by concatenation as illustrated in FIG. 5.

Figure 5:
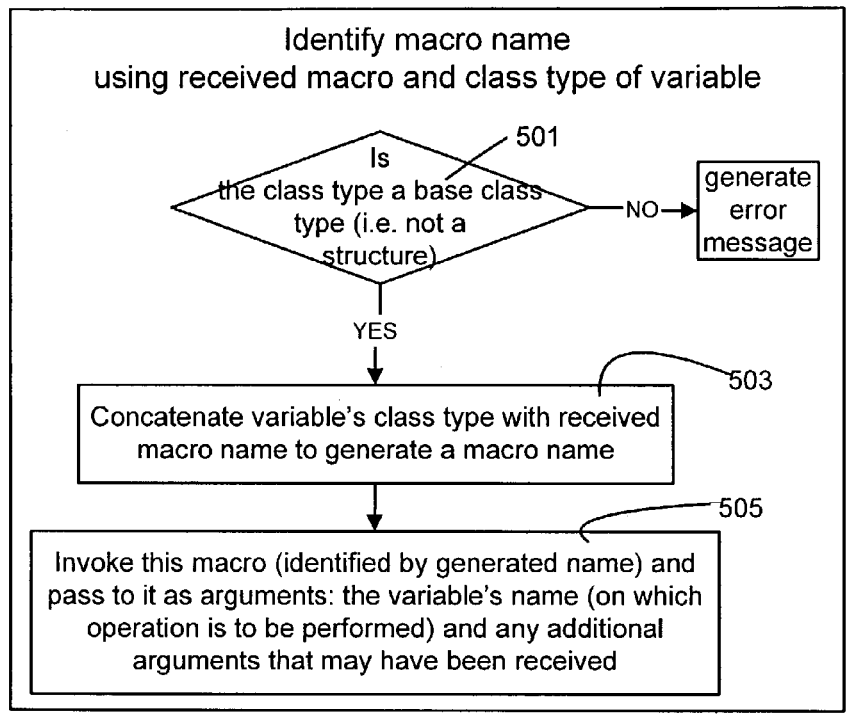
FIGS. 5 and 6 illustrate, in flow charts, performance of acts 413 and 415 respectively of FIG. 4B.

Specifically, as illustrated by act 501 in FIG. 5, the macro expander checks if the class type is a base class type (i.e. not a structure), and if no generates an error message. If the class type is a base class, then the macro expander goes to act 503 and concatenates the variable's class type with received macro name to generate a macro name.

It is this generated macro name that is used to perform the operation. For example, the name of a move macro for use with a variable that has been previously declared to be of type ux_t (during instantiation) is generated by concatenation of "ux_t" with "_move", to obtain ux_t move as the macro to be invoked. On the other hand if the variable was of type u8_t then the to-be-invoked macro has the name u8_t_move. In one embodiment, the type of a class to which the variable belongs occurs first, followed by the name of the move macro as described above. However in an alternative embodiment, the order of the two tokens that are concatenated may be reversed. Note that the specific order is not critical so long as the order is known (i.e. predetermined). The order must be predetermined so that one or more macros that are written manually are named to have the name obtained by such concatenation.

Next, the macro identified by generated name is invoked in act 505 (assuming it has been defined and has been added to the macro library of the macro expander). During invocation, the macro receives as arguments: the variable's name (on which operation is to be performed) and any additional arguments that may have been received in act 413.

Figure 6:
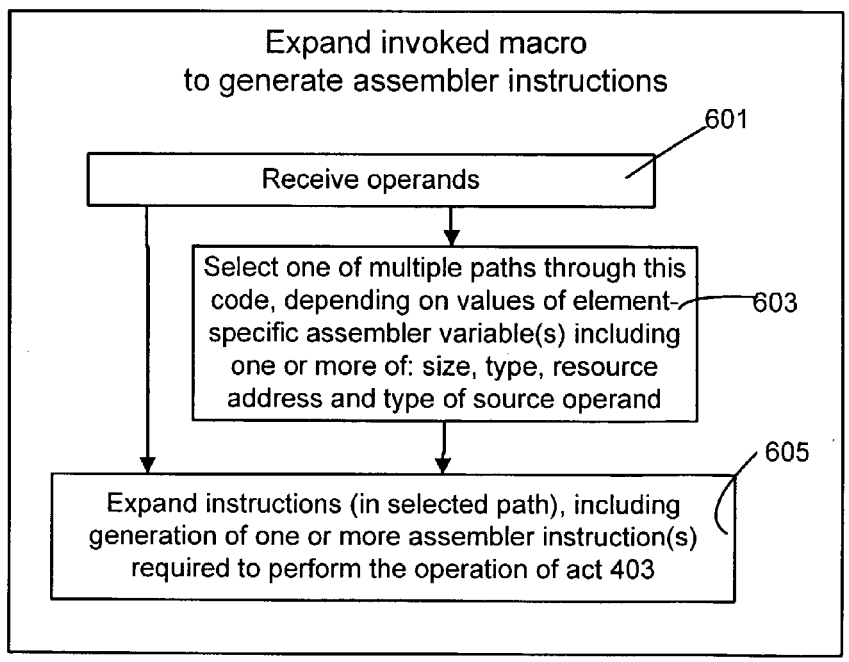

When invoked, the macro is expanded in some embodiments, as illustrated in FIG. 6. Specifically, in act 601, the operands are received. Then in act 603, the macro expander selects one of several paths through the code for this macro, depending on values of one or more attributes of the source operand that are held in element-specific assembler variable(s). For example, the source operand's size, type, as well as the resource address (and optionally resource type) to which the source operand is bound are taken into account in deciding the path to be selected.

Thereafter, as illustrated by act 605, one or more instructions in the selected path are expanded. The instructions being executed generate one or more assembler instructions that are appropriate for implementation of the operation taking into account the assembler syntax and the variable's attributes.

Figure 7:
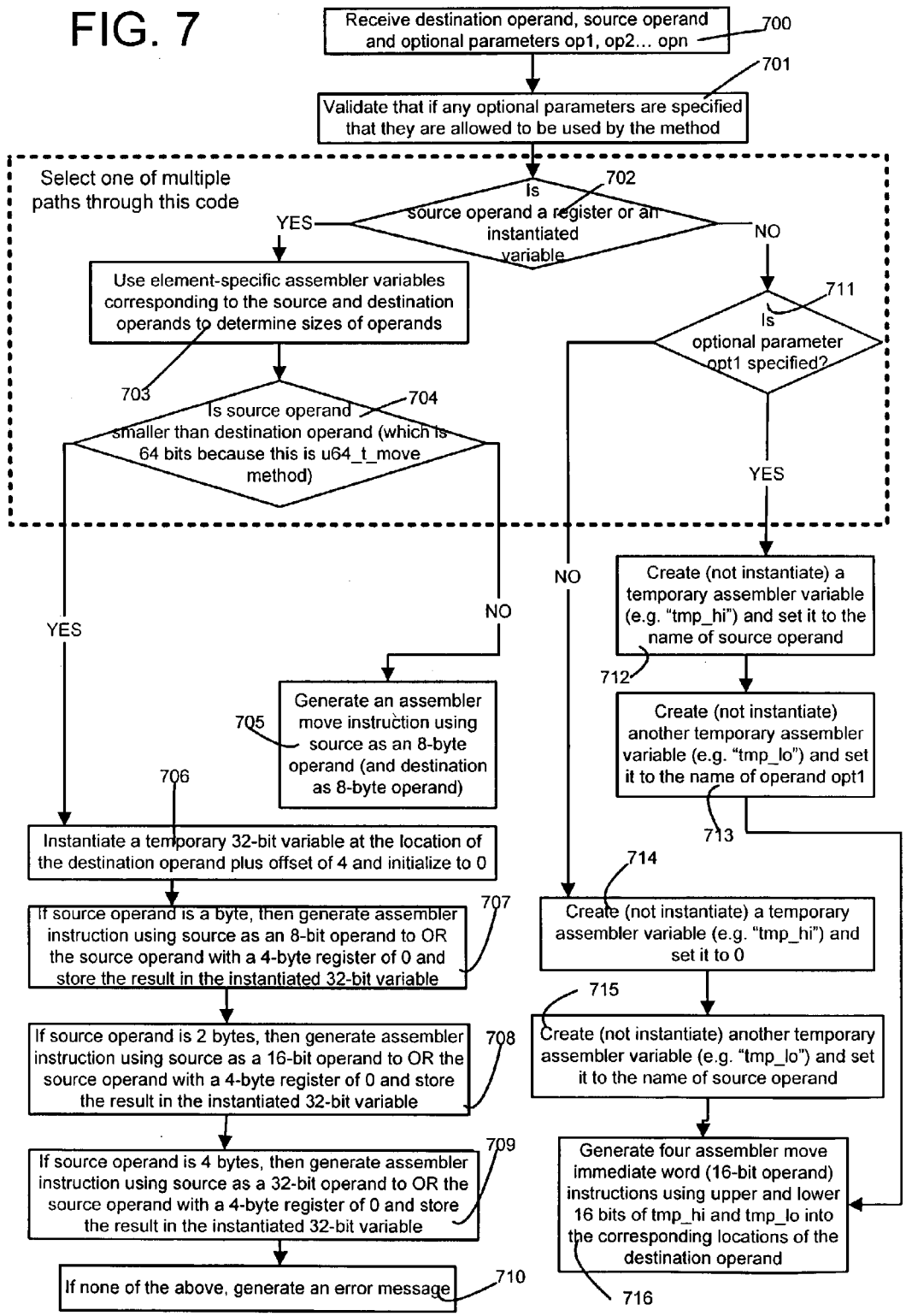
FIGS. 7-9 illustrate, in flow charts, acts of the type illustrated in FIG. 6 that are performed when taking into account various attributes of a source operand.
Figure 8:
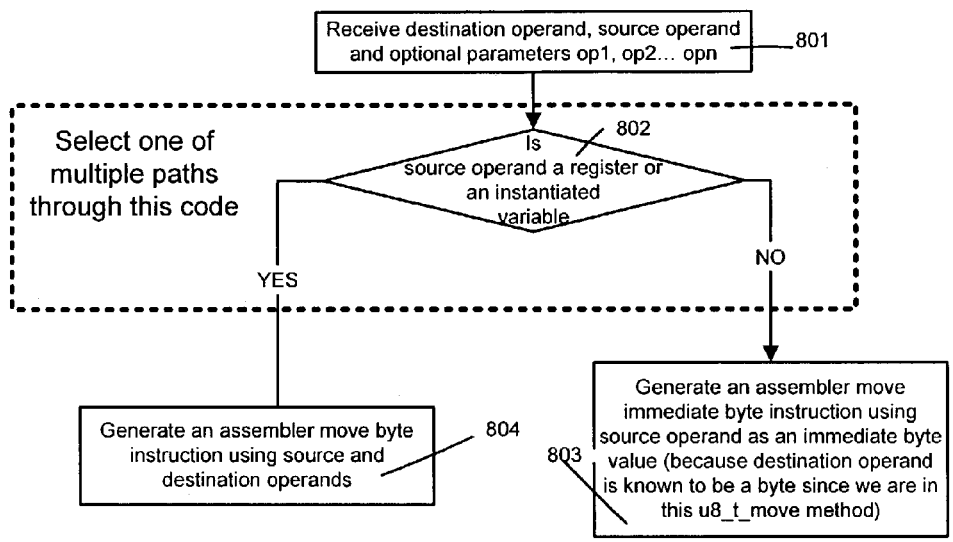
Figure 9:
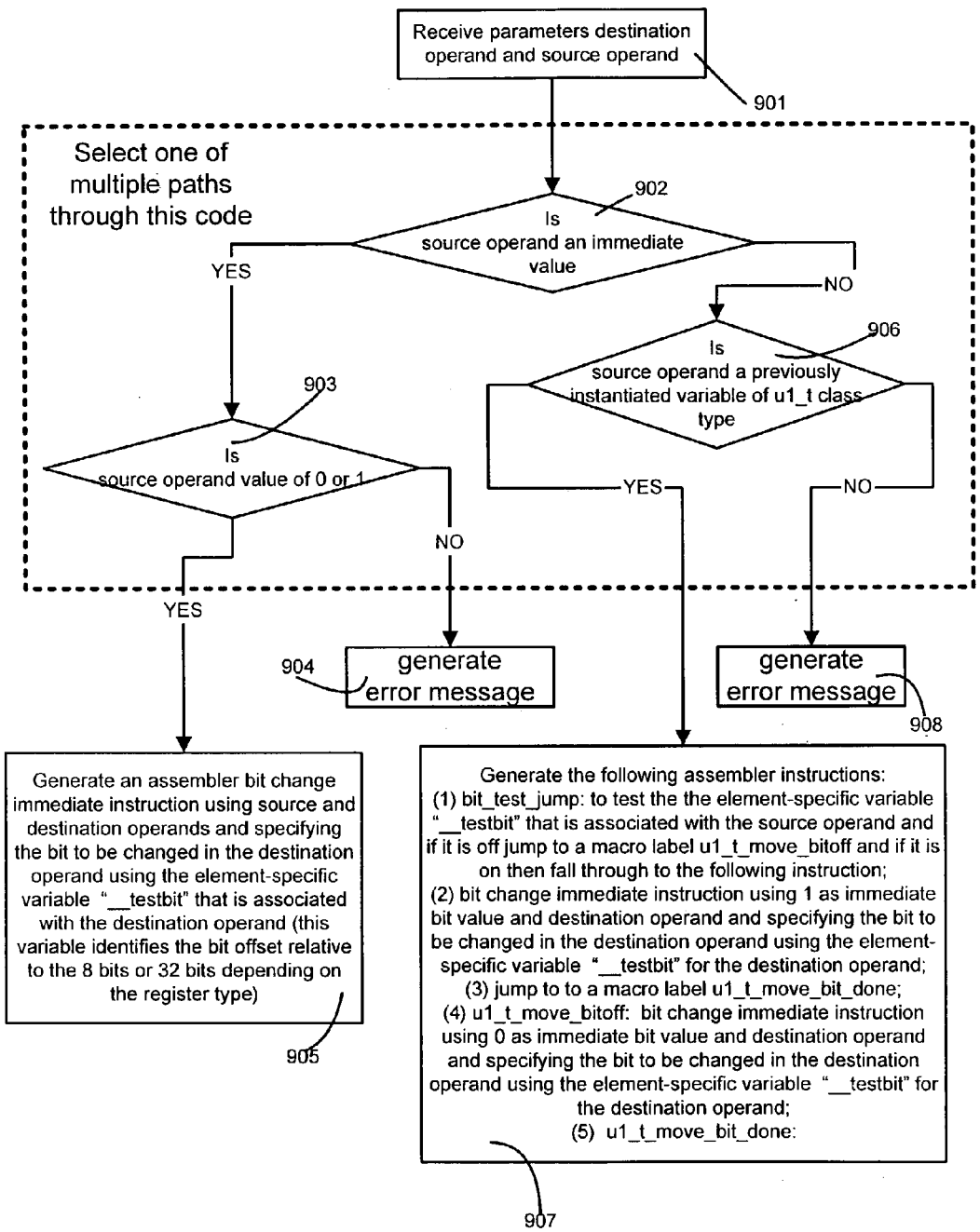

In one specific embodiment, three different macros that are manually written, to perform a move operation on source operands of three different sizes, are illustrated in FIGS. 7-9. Specifically, a macro (e.g. "move") for a move operation for a source operand belonging to the class u64_t (i.e. a 64 bit unsigned operand) is translated to u64_tmove which identifies the macro to be invoked, and thereafter the macro expander performs acts 700-716.

In act 700, the macro expander receives destination operand, source operand and optional parameters op1, op2 . . . opn. Next, in act 701, the macro expander confirms that if any optional parameters are specified that they are allowed to be used by the method, and if not an error is generated. Specifically, in this example, only one optional parameter namely op1 is permitted by the method shown in FIG. 7.

Furthermore, in act 702 (which implements act 603 in this example) the macro expander checks if source operand a register or an instantiated variable. If the answer is yes, then the macro expander uses (as per act 703) element-specific assembler variables corresponding to the source and destination operands to determine sizes of operands. Thereafter, in act 704, if the source operand is smaller than destination operand then acts 706-710 are performed and otherwise act 705 is performed (described below). Note that in act 704, there is no need to check on the size of the destination operand because this method u64_t_move (in FIG. 7) is invoked only when the destination operand is 64 bits (and therefore has a known size, by definition). Furthermore, in certain embodiments, the checking is performed after determining the sizes to be compared as follows: concatenate "_bytesize" with source operand's name and get the value of an element-specific assembler variable identified by the concatenation. In act 704, the macro expander then looks at the just-described value, to see if it is less than a corresponding value for the destination operand.

In act 705, the macro expander generates an assembler move instruction using source as an 8-byte operand (and destination as 8-byte operand). In act 706, a temporary 32-bit variable is instantiated, at the location of the destination operand plus offset of 4 and initialized to 0. Next, in act 707, if source operand is a byte, then the macro expander generates assembler instructions using source as an 8-bit operand to OR the source operand with a 4-byte register of 0 and store the result in the instantiated 32-bit variable. Thereafter, in act 708, if source operand is 2 bytes, then the macro expander generate assembler instruction using source as a 16-bit operand to OR the source operand with a 4-byte register of 0 and store the result in the instantiated 32-bit variable. Next, in act 709, if the source operand is 4 bytes, then the macro expander generates assembler instructions using source as a 32-bit operand to OR the source operand with a 4-byte register of 0 and store the result in the instantiated 32-bit variable.

Referring to the "no" branch out of the decision in act 702, an optional parameter (such as opt1) is checked as per act 711. Moreover, acts 712, 713 and 716 are performed by the macro expander if there is an optional parameter opt1 specified. If opt1 is not specified, acts 714, 715 and 716 are performed by the macro expander. Specifically, in act 712, the macro expander creates (not instantiate) a temporary assembler variable (e.g. "tmp_hi") and sets it to the name of source operand. Similarly, in act 713, the macro expander creates (not instantiate) another temporary assembler variable (e.g. "tmp_lo") and sets it to the name of operand opt1.

Thereafter, control transfers to act 716, the macro expander generates four assembler move immediate word (16-bit operand) instructions using upper and lower 16 bits of tmp_hi and tmp_lo into the corresponding locations of the destination operand. Note that in act 714, the macro expander creates (not instantiate) a temporary assembler variable (e.g. "tmp_hi") and sets it to 0. Thereafter, in act 715, the macro expander creates (not instantiate) another temporary assembler variable (e.g. "tmp_lo") and set it to the name of source operand. Next, act 716 is performed in the manner described above.

In a similar manner, a macro for a move operation for a source operand belonging to the class u8_t (i.e. an 8 bit unsigned operand) performs acts 801-804. In act 801, the macro expander receives destination operand, source operand and optional parameters op1, op2 . . . opn. Note that any optional parameters are simply ignored in one embodiment of this macro. Next, in act 802, (which implements act 603 in this example) the macro expander checks if source operand is either a register or an instantiated variable (note that this act is same as act 702). If the answer is yes, then the macro expander generates an assembler move byte instruction, using source and destination operands as per act 804. If the answer is no, then the macro expander generates an assembler move immediate byte instruction, using source operand as an immediate byte value (and because the destination operand is known to be a byte because the macro u8_t_move being expanded is only invoked by the add_element macro if the destination is 8 bits).

In a similar manner, a macro for a move operation for a source operand belonging to the class u1_t (i.e. a single bit field operand) performs acts 901-908. In act 901, the macro expander receives destination operand and source operand (but no optional parameters). Next, in act 902, (which together with acts 904 and 906 implements act 603 in this example) the macro expander checks if source operand is an immediate value. If the answer is yes in act 902, the macro expander goes to act 904 and checks if source operand's value is one of (1 or 0), thereby to perform error checking (e.g. value 2 will be flagged as an error).

If the answer is no in act 904, the macro expander goes to act 904, and generates an error message. If the answer is yes in act 904, the macro expander goes to act 905, and generates an assembler bit change immediate instruction. In generating this instruction, the macro expander identifies the source and destination operands and also identifies the single bit that is to be changed in the destination operand. The bit to be changed is identified using the element-specific variable "_testbit" that is associated with the destination operand (this variable identifies the bit offset relative to the 8 bits or 32 bits depending on the resource type).

If the answer is no in act 902, the macro expander goes to act 906 and checks if source operand is a previously instantiated variable of the u1_t class type. Note that during instantiation an element-specific assembler variable was initialized with the class type for this variable. If the answer in act 906 is no an error message is generated in act 908.

If the answer in act 906 is yes assembler instructions are generated in act 907 as follows: 1) bit_test_jump: to test the element-specific variable "_testbit" that is associated with the source operand and if it is off jump to a macro label u1_t_move_bitoff and if it is on then fall through to the following instruction; (2) bit change immediate instruction using 1 as immediate bit value and destination operand and specifying the bit to be changed in the destination operand using the element-specific variable "_testbit" for the destination operand; (3) jump to a macro label u1_t_move_bit_done; (4) u1_t_move_bitoff: bit change immediate instruction using 0 as immediate bit value and destination operand and specifying the bit to be changed in the destination operand using the element-specific variable "_testbit" for the destination operand; and (5) u1_t_move_bit_done: (this is just a label; there is no instruction).

As seen from the above description of FIGS. 7-9, several details related to a move operation are encapsulated in each of three macros, and one of the three macros is automatically selected by a macro expander in accordance with the invention, based on the class type of the source operand. Therefore, it is not necessary for the programmer to know such details, so long at the programmer has provided the information necessary to identify the source operand's class type. Such information is normally provided during instantiation of the source operand and is saved in one or more assembler variables for future use in identifying an appropriate macro to be used to perform an operation specified by the programmer.

Although only three macros for variables of three class types are illustrated in FIGS. 7-9, any number of such macros may be used, depending on the embodiment. In one embodiment, the following base classes are defined for use with assembly language programs for a network processor:

| | |
|---|---|
| u1_t | single bit field |
| ux_t | multiple bit field (2 bits through 7 bits) |
| u8_t | unsigned byte field (8 bits) |
| u16_t | unsigned word field (16 bits) |
| u32_t | unsigned double word field (32 bits) |
| u48_t | unsigned 6-byte field (48 bits) |
| u64_t | unsigned long word field (64 bits) |

The above-identified base classes are classes that are not built on top of another class, and are therefore not derived from any other class. The base classes normally have one or more macros associated therewith to perform the corresponding operations.

Figure 10:
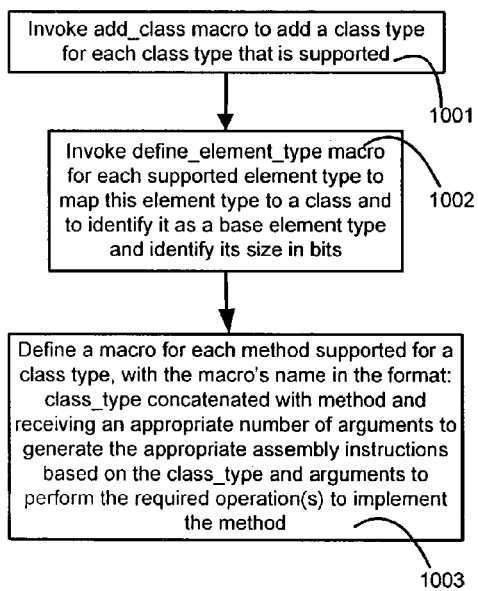
FIG. 10 illustrates, in a high level flow chart, the binding of methods with classes that have predetermined method (and for this reason the classes are considered "base" classes).

As illustrated by act 1001 in FIG. 10, these base classes are defined in one embodiment, by invoking the add_class macro. The add_class macro of one exemplary implementation contains two statements, a first statement sets up and initializes a class-specific assembler variable, that starts with the predetermined character string "class_type_" and ends with the specific name of the class, such as u1_t, ux_t, u8_t, and u16_t. The first statement initializes the just-described variable to have the value currently held in a global assembler variable namely nPk_class_types. Thereafter, in a second statement in add_class macro simply increments nPk_class_types. In one embodiment, in addition to base classes of the type described above, there are a number of base element types which may be thought of as derived classes. Each base element type must be associated with a base class type but not necessarily the other way around (e.g. a base class may have no base element type associated with it, or it may have 10 base element types associated with it). In this embodiment, the following base element types are supported:

| | |
|---|---|
| u1_t | single bit field |
| u2_t | 2 bit field |
| u3_t | 3 bit field |
| u4_t | 4 bit field |
| u5_t | 5 bit field |
| u6_t | 6 bit field |
| u7_t | 7 bit field |
| u8_t | unsigned byte field (8 bits) |
| u16_t | unsigned word field (16 bits) |
| u32_t | unsigned double word field (32 bits) |
| u48_t | unsigned 6-byte field (48 bits) |
| u64_t | unsigned long word field (64 bits) |

Base element types are well-known data types which can by used by a programmer for defining data variables and data structure members. Base element types allow variables of their respective types to be operated on by the corresponding methods of a base class.

As illustrated by act 1002 in FIG. 10, base element types are defined in one embodiment, by invoking the define_element_type macro. The define_element_type macro of one exemplary implementation is invoked with the following arguments (each of which is an attribute of the base element type being defined): name, size, flag and class. For example, the above described base element types are defined by the following invocations of the define_element_type macro:

define_element_type u1_t, 1, 0, u1_t define_element_type u2_t, 2, 0, ux_t define_element_type u3_t, 3, 0, ux_t define_element_type u4_t, 4, 0, ux_t define_element_type u5_t, 5, 0, ux_t define_element_type u6_t, 6, 0, ux_t define_element_type u7_t, 7, 0, ux_t define_element_type u8_t, 8, 0, u8_t define_element_type u16_t, 16, 0, u16_t define_element_type u32_t, 32, 0, u32_t define_element_type u48_t, 48, 0, u48_t define_element_type u64_t, 64, 0, u64_t When invoked, macro define_element_type performs the following acts. Macro define_element_type uses the value of flag that is received as an argument to initialize an element-type specific assembler variable that starts with the predetermined character string "element_type_" and ends with the specific name of the element type, such as u1_t (this is the first argument to define_element_type macro).

Furthermore, if the flag indicates that the current element type being defined is of a base class, then macro define_element_type saves the size (received as the second argument to define_element_type macro) in bits and in bytes in two element-type specific assembler variables, namely element_size_name and name_bytesize wherein name is replaced with the appropriate value (of the first argument to define_element_type macro).

Also, if a class-specific assembler variable class_type_class is currently defined then its value is used by define_element_type to define and initialize an element-type specific assembler variable element_class_name and otherwise an error message is generated. Moreover, macro define_element_type increments a global assembler variable nPk_element_types (which used to confirm that the element_ type was previously undefined because we do not want to multiply define the same element).

Finally, in addition to definition of base classes and base element types as discussed above in reference to acts 1001 and 1002, it is necessary to define a number of macros (also called "base methods") as per act 1003 in FIG. 10. Specifically, in act 1003, a macro is defined to support each base method for each class type, with the macro's name in the format: class_type concatenated with method name (e.g. in the form of name wherein name is substituted with the actual name of the method, such as "move"). Each macro name receives an appropriate number of arguments that are required to generate the appropriate assembly instructions, based on the class_type and the arguments needed to perform the required operation(s) to implement the base method.

Base methods that are currently supported in one embodiment are: move, if, shift, and, or, xor, add, addc, sub and subb. Note that "addc" and "subb" are equivalents of add and sub for handling carry and borrow conditions. As noted above, base methods are implemented as individual macros associated with each base class. Also as noted above, a binding of each method to each class is made at assembler time, via the concatenation of the base class name and the method name. For example, the move method for a ux_t type variable maps to the macro "ux_tmove", whereas the move method for a u8_t variable maps to the macro "u8_tmove".

Base methods are invoked by the programmer via a macro call in the form:

name, opA, opB [, opC]

where:

opA is the destination operand opB is the source operand opC is an optional source operand.

An example is: move var1, var2.

Each base method may be implemented by a macro which, in general terms, perform the following: (1) validates that the destination operand has been defined; (2) validates that the destination and source operands are valid; (3) recasts the source operand(s) as needed to match the destination; and (4) invokes the specific method macro defined for the base class of the destination.

In one embodiment, the following macros have been manually prepared, and by virtue of their names they are automatically invoked by the macro expander when their respective operations are to be performed on variables whose types are derived from the respective base classes:

u1_t_typecast dest_var, src_reg, var, off u1_t_move dest, src u1_t_if opa, operator, opb, jmp_label ux_t_typecast dest_var, src_reg, var, off ux_t_move dest, src ux_t_if opa, operator, opb, jmp_label
u8_t_typecast dest_var, src_reg, var, off
u8_t_move dest, src
u8_t_if opa, operator, opb, jmp_label
u8_t_shift dest, src, shift, dir
u8_t_add dest, src, val
u8_t_addc dest, src, val
u8_t_sub dest, src, val
u8_t_subb dest, src, val
u8_t_and dest, src, val
u8_t_or dest, src, val
u8_t_xor dest, src, val
u16_t_typecast dest_var, src_reg, var, off
u16_t_move dest, src
u16_t_if opa, operator, opb, jmp_label
u16_t_shift dest, src, shift, dir
u16_t_add dest, src, val
u16_t_addc dest, src, val
u16_t_sub dest, src, val
u16_t_subb dest, src, val
u16_t_and dest, src, val
u16_t_or dest, src, val
u16_t_xor dest, src, val
u32_t_typecast dest_var, src_reg, var, off
u32_t_move dest, src
u32_t_if opa, operator, opb, jmp_label
u32_t_shift dest, src, shift, dir
u32_t_add dest, src, val
u32_t_addc dest, src, val
u32_t_sub dest, src, val
u32_t_subb dest, src, val
u32_t_and dest, src, val
u32_t_or dest, src, val
u32_t_xor dest, src, val
u48_t_typecast dest_var, src_reg, var, off
u48_t_move dest, src
u48_t_if opa, operator, opb, jmp_label
u48_t_and dest, src, val
u48_t_or dest, src, val
u48_t_xor dest, src, val
u64_t_typecast dest_var, src_reg, var, off
u64_t_move dest, src
u64_t_if opa, operator, opb, jmp_label
u64_t_add dest, src, val
u64_t_sub dest, src, val
u64_t_and dest, src, val
u64_t_or dest, src, val
u64_t_xor dest, src, val Note that when writing the assembly language program to use the macros described above, a programmer may use method names that are preceded by an underscore. An underscore (or other such character) is used so that the assembler does not interpret the macro name as an assembler instruction, in embodiments where the base method names implemented are identical to their functionally equivalent assembler instructions. In such embodiments, a user-specified macro e.g. move is processed as a macro and expanded by the macro assembler, rather than treated as a move instruction. Base methods can be assigned names which are made significantly different from (and therefore not to conflict with) existing assembler instructions, but such names may not appear intuitive to a programmer who is using them.

Figure 11:
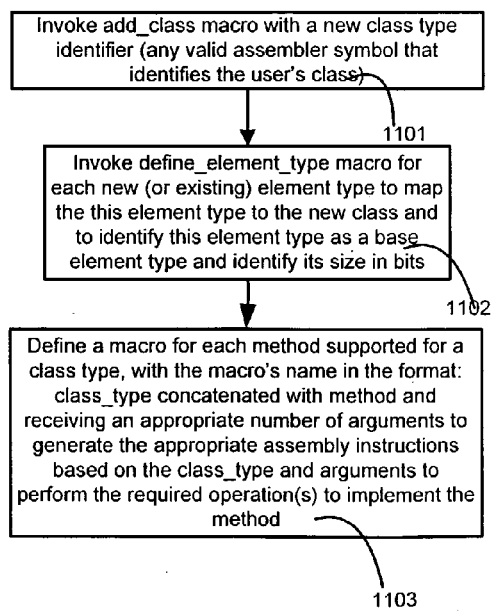
FIG. 11 illustrates, in a flow chart similar to FIG. 10, acts that may be performed by a user to extend a set of predefined base classes, by specifying their own class and binding their own methods to the specified class.

Mechanisms do exist in some embodiments to add new base classes and base methods for the new classes, as illustrated in FIG. 11. Specifically, in act 1101 the user may invoke add_class macro with a new class type identifier (any valid assembler symbol that identifies the user's class). Note that when the user is adding a class type, the user can also add new assembler variables that are needed to implement all the methods for the class type.

Thereafter, in act 1102 the user may invoke define_element_type macro for each new element type to map this element type to the new class and to identify this element type as a base element type and identify its size in bits. Note that in certain situations a user may also invoke define_element_type macro for existing classes, e.g. to define a new data type that inherits all the methods of an existing class.

Thereafter in act 1103, the user manually defines a macro for each method supported for a class type, with the macro's name in the above-described format: class_type concatenated with method, and for receiving an appropriate number of arguments to generate the appropriate assembly instructions based on the class_type and arguments to perform the required operation(s) to implement the method.

An embodiment of the type described herein provides an abstracted instruction set for manipulating data independent of the type, class, and underlying instruction set, all without a compiler. Essentially, a new instruction set is created in the form of macros to provide methods that are bound to each class of variables at assembler time. Although examples of classes and base element types illustrated herein are in terms of data of various sizes, it is also possible to have classes within data of the same size. For example, a class may be formed for any resource which has unique characteristics. This allows data to be abstracted into an object.

Embodiments of the type described herein cover classes of structures for which methods are defined. For example a user may define a new element type of "eframe" and associate this type to a new base class of "ethernet", and define macros associated with the ethernet class. Such macros can be used to perform operations that are unique to instances of the "eframe" element type, e.g. one macro may transmit an instance of eframe, and another macro may perform address look on the instance. Such embodiments abstract the underlying specifics of manipulating an Ethernet frame. Therefore a programmer can use a collection of methods for such a base class to perform assembly language programming at an abstract level to implement operations on such an element type.

In embodiments of the type described herein, the specific details of a particular network processor resource, as well as, the network processor assembler instruction set itself, are hidden from the programmer. This allows the programmer to focus solely on the data object and the desired functional operation to be performed, regardless of its type, class or network processor's architecture and instruction set (which defines the assembler syntax).

Use of macros in some embodiments of the type described herein very closely approaches C++ object-orientated programming model, without the overhead of passing object pointers to each method, as each method is dynamically bound at assembler time to the data object it is operating on. These features allow high level code to be written in the form of macros, and the macros visible to the programmer can be named with sufficiently descriptive names to allow the programmer to write assembly language programs that are easy to comprehend, easy to modify, highly portable, and non-specific to a particular network processor instruction set.

If such assembly language programs using macros of the type described herein need to be ported from one network processor instruction set to another, no change is required for the following reason. All changes to support the porting need to be made only within the macro definitions for the methods associated with base classes, e.g. u1_t_typecast, u1_t_move, u1_t_if, ux_t_typecast, ux_t_move, and ux_t_if. Therefore, no changes need to be made to the assembly language programs written by the programmer, which results in a significant savings in time and effort.

Embodiments of the type described herein also provide type-checking at assembler time based on the data type and resource class, as well as a base framework which is extendable by the programmer, i.e. the ability to add new data types, instructions, and resource classes. This potentially allows any data type and any operation to be supported on any network processor resource, regardless of the network processor instruction set.

In some embodiments, data objects are defined using data structure definitions as described above in reference to FIGS. 1-3D. As described above, these data structure definitions can be mapped to or assigned a location in a selected Network Processor resource via the cast_var macro. A set of abstracted instructions can then be used to perform operations on the data object which are independent of its specific data type, associated Network Processor resource, or the underlying Network Processor instruction set. Such an abstracted instruction set may be limited to being used only on data objects defined using this method.

Each abstracted instruction in one embodiment is actually an Assembler Macro that is expanded at compile time and automatically generates the necessary Network Processor instructions for the specified operation. The instructions generated are totally dependent on the data object type, the Network Processor resource, and the underlying Network Processor instruction set. Furthermore, the macros implementing these abstracted instructions can detect errors such as illegal operations, mis-matched sizes between operands, etc. at assembler time.

An instruction set that is made visible to a programmer by use of macros as described herein is as follows in one embodiment of the invention:

1. _move

The move instruction has the following syntax:

_move dest, source where dest: a data object created via the cast_var command source: a data object created via the cast_var command or an immediate data value up to 64-bits examples:

_move next_hop, ipv4_hdr.destination_addr

_move next_hop, 0x0a010101

No size has to be specified as it is automatically determined based on the implied size of the destination data object. Also, the immediate data field can be larger than the size allowed by the underlying network processor instruction set.

2. _shift

The _shift instruction has the following syntax:

_shift direction, dest [, source], shift_count where direction: L to specify left, R to specify right dest: a data object created via the cast_var command source: optional data object created via the cast_var command.

if not specified, dest is assumed to be the source shift_count: number of bits to shift. can be speci.ed in a register, data_object, or as immediate data.

examples:

_shift L, vlan_tag.p_bits, 0x4

_shift R, domain, user_record.index, R0__0

No size has to be specified as it is automatically determined based on the implied size of the destination data object. Also, the immediate data field can be larger than the size allowed by the underlying network processor instruction set.

3. _if

The _if instruction has the following syntax:

_if opA, operator, opB goto label where opA: a data object created via the cast_var command operator: one of the following operators:

is_eq (is equal)

is_ne (is not equal)

is_gt (is greater than)

is_ge (is greater than or equal)

is_lt (is less than)

is_le (is less than or equal)

opB: a data object created via the cast_var command, or an immediate data value up to 64-bits label: label to jump to if the operator condition is TRUE examples:

_if record.valid_bit is_eq TRUE, goto process_record

_if ipv4_hdr.ttl is_eq 0, goto discard_frame

_if next_hop_addr is_ne default_router_ip, goto lookup_addr

No size has to be specified as it is automatically determined based on the implied size of the destination data object. Also, the immediate data field can be larger than the size allowed by the underlying network processor instruction set. The data object can be a bit field.

4. _add, _addc

The _add and _addc instructions have the following syntax:

_add dest, [source,] value

_addc dest, [source,] value where dest: a data object created via the cast_var command source: optional data object created via the cast_var command value: immediate data value examples:

_add stats.rx_bytes, ip_pkt.length

_addc checksum, 1

_add errors, frame_errors

No size has to be specified as it is automatically determined based on the implied size of the destination data object. Also, the immediate data field can be larger than the size allowed by the underlying network processor instruction set.

5. _sub

The _sub instruction has the following syntax:

_sub dest, [source,] value where dest: a data object created via the cast_var command source: optional data object created via the cast_var command value: immediate data value examples:

_sub frame_length, ip_pkt.length

_sub header_size, 10

No size has to be specified as it is automatically determined based on the implied size of the destination data object. Also, the immediate data field can be larger than the size allowed by the underlying network processor instruction set.

6. _and

The _and instruction has the following syntax:

_and dest, [source,] value where dest: a data object created via the cast_var command source: optional data object created via the cast_var command value: immediate data value examples:

_and vlanTag, vlanTagMask

_and vlanId, vlanTag, 0x0FFF

_and flags, 0x04

No size has to be specified as it is automatically determined based on the implied size of the destination data object. Also, the immediate data field can be larger than the size allowed by the underlying network processor instruction set.

7. _or

The _or instruction has the following syntax:

_or dest, [source,] value where dest: a data object created via the cast_var command source: optional data object created via the cast_var command value: immediate data value examples:

_or flags.state, 0x2000

_or flags.state, pkt_state

_or frame.vlanTag, vlanID, 0x4000

No size has to be specified as it is automatically determined based on the implied size of the destination data object. Also, the immediate data field can be larger than the size allowed by the underlying network processor instruction set.

8. _xor

The _or instruction has the following syntax:

_xor dest, [source,] value where dest: a data object created via the cast_var command source: optional data object created via the cast_var command value: immediate data value examples:

_xor flags.state, port_mode

_xor flags.state, port_mode, 0x000F

_xor flags.state, 0x04

No size has to be specified as it is automatically determined based on the implied size of the destination data object. Also, the immediate data field can be larger than the size allowed by the underlying network processor instruction set.

Certain embodiments of the type described herein allow a programmer to focus on solely on the data being operated on and the type of operation being performed. These embodiments provide a high-level instruction syntax which removes all the low-level details required to develop efficient assembler code for a network processor. This is done without a high-level compiler. This allows code to be developed in a timely manner which is easy to understand, easy to maintain, and is highly portable. It also reduces the learning curve involved for first time network processor programmers, and could help attract more high-level programmers into the network processor programming environment.

In certain embodiments illustrated in act 1103 in FIG. 11, a programmer manually defines a macro for each method supported for a class type, by following a predetermined format. In other embodiments, the predetermined format is hidden from such a programmer, through a script or preprocessor directives wherein the script generates the macro name after receiving as input the class_type of an operand, the name of an operation to be performed on the operand, and the body of a macro that implements the operation. Moreover, instead of class_type, any other attribute (such as size) of an operand may be used in other embodiments to automatically generate a macro name.

In one embodiment illustrated in the attached software, a Tcl script converts one or more statements in conformance with the C syntax into corresponding statements that conform to an abstracted instruction set implemented using macros as described herein. For example, two variables A and B are each individually instantiated using the cast_var macro, and if there is a statement "A=B;" (which is a statement in the C language using the "=" operator), then the Tcl script converts this statement into the following statement "_move A,B" to move the data from B into A. Although this example illustrates use of the "=" operator, one or more other such reserved words in the C language are also translated by the Tcl script in the above-described manner, in other examples of such an embodiment.

Numerous modifications, variations and adaptations of the examples, embodiments, and implementations described herein will be apparent to the skilled artisan in view of the disclosure.

Depending on the data to be held in a member of a structure, a member-definition macro of the type discussed above may itself contain a structure-definition macro, i.e. a number of structure-definition macros may be nested within one another, in a recursive manner.

Instead of using the above-described "." as a separator between a structure's name and a member's name, any other separator (e.g. a dash namely "-") may be used in other embodiments, as long as the separator is accepted by the assembler as a portion of a variable name.

Therefore, numerous modifications, variations and adaptations of the examples, embodiments, and implementations described herein are encompassed by the attached claims.

Numerous modifications, variations and adaptations of the examples, embodiments, and implementations described herein will be apparent to the skilled artisan in view of the disclosure.

Depending on the data to be held in a member of a structure, a member-definition macro of the type discussed above may itself contain a structure-definition macro, i.e. a number of structure-definition macros may be nested within one another, in a recursive manner.

Instead of using the above-described "." as a separator between a structure's name and a member's name, any other separator (e.g. a dash namely "-") may be used in other embodiments, as long as the separator is accepted by the assembler as a portion of a variable name.

Therefore, numerous modifications, variations and adaptations of the examples, embodiments, and implementations described herein are encompassed by the attached claims.

APPENDIX B

The following acts illustrate a method for converting a typedef struct definition according to the C language into the following (a) invocation of macro "add_structure_name," (b) structure-definition macro being dynamically built based on the C structure element definitions provided by the programmer and (c) invocation of macro "add_structure_type."

(1) Read line
    (2) Remove C comments
    (3) if "typedef struct" not found at beginning of

APPENDIX B-continued current line goto (1) else goto (4)
    (4) set $work = current line
    (5) Read line
    (6) Remove C comments
    (7) append current line to end of $work variable
    (8) Are there an equal number of '{' and '}' in $work? if yes, goto (9) else goto (5)
    (9) Is the terminating ';' present in $work? if yes, goto (10) else goto (5)
    (10) Normalize whitespace in $work variable (eliminate newlines, add spaces around '{', '}', ':', and ';'
        characters, then collapse multiple spaces into single spaces and change '{' to '{' and '}' to '}')
        (This is to facilitate TCL parsing by making the C syntax follow the syntax rules for TCL lists)
    (11) Call subroutine to process $work variable as a typedef statement
        (this PROCESS_STATEMENT routine recursively handles the assembly macro generation)
    (12) goto (1)
PROCESS_STATEMENT Routine
    Background: TCL treats single spaces as list element separators, and items enclosed in curly braces { } are considered
        a single element of the list, so a C statement like
        typedef struct { . . . statements . . . } struct_t;
    is a list of 4 elements, while the third element is a string of C statements that is recursively processed
        Also note that context stacks are used in this algorithm although they are not explicitly described.
    (1) Are the first two words "typedef struct"? if yes, goto (2) else goto (13)
    (2) set $name to fourth element in argument list
    (3) push "typedef_struct" and $name onto type and name context stacks respectively
    (4) output assembly instructions
        add_structure_name $name
        macro $name, base_name
    (5) set $work = third element of input list
    (6) if $work is empty, goto (10) else (7)
    (7) extract statement from $work variable
        (return all chars from string beginning to ';' (or end if ';' not found) removing them from $work variable)
    (8) call PROCESS_STATEMENT using extracted statement
    (9) goto (6)
    (10) output assembly instructions
        mend
        add_structure_type $name
    (11) pop type and name context stacks
    (12) RETURN
    (13) Is the first word "union"? if yes, goto (14) else goto (25)
    (14) set $name to third element in argument list
    (15) push "union" and $name onto type and name context stacks respectively
    (16) output assembly instruction
        begin_union $name
    (17) set $work = second element of input list
    (18) if $work is empty, goto (22), else (19)
    (19) extract statement from $work variable
        (return all chars from string beginning to ';' (or end if ';' not found) removing them from $work variable)
    (20) call PROCESS_STATEMENT using extracted statement
    (21) goto (18)
    (22) output assembly instruction
        end_union $name
    (23) pop type and name context stacks
    (24) RETURN
    (25) [Should be "type_t member_name") pair]
        set $type = first element of input list

APPENDIX B-continued

(26) set $name = second element of input list
(27) if (top of type context stack) ==
"typedef_struct", goto (28) else (30)
    (28) output assembly instruction
        add_element base_name, $name, $type
    (29) RETURN
    (30) if (top of type context stack) == "union",
goto (31) else (34)
    (31) set $union_name = (top of name context stack)
    (32) output assembly instruction
        add_union_element $union_name,
base_name, $name, $type
    (33) RETURN
    (34) Report error and exit

APPENDIX C

The following is description of how to use a Tcl/Tk script to convert C syntax (for both structure definitions and also operators) into structure-defining macros and method macros.

In general, single lines are converted from C syntax to the corresponding asm or nPk macros, with unrecognized constructs being passed to the output unmodified. This allows asm code to be intermingled with C syntax. This line oriented approach means the C syntax constructs *must* follow the restriction of being on a single line. Any whitespace in a single line is ignored, unless required for token delimiting. This also means only a single C statement can occur on a given line.

A notable exception to this "line oriented" rule is the
"typedef struct"
statement. If a line begins with "typedef struct", all subsequent lines are read in until the structure is closed. In this case, all additional whitespace (including newlines) are ignored and unrecognized constructs will cause an error rather than passing through to the output file.

"//" style C comments are allowed anywhere on lines that are supported C constructs including within the typedef struct blocks. The following terms are used below:
    <string-0>: A string that matches the following character set [a-zA-Z0-9_]
    <string-1>: A string that matches the following character set [a-zA-Z0-9_.<>!]
    <ident>: An identifier in one of the following forms -
        <string-1>
        This is a simple identifier and can represent any variable name or constant
        (<string-0>) <string-1>
        This is an in-line type cast expression (whitespace in/around the parentheses is ignored) that generates an additional nPk macro call to perform the typecast function prior to using the identifier in the specified statement. The <string-0> is the <type>, while the <string-1> represents the <variable-name> as in the corresponding C syntax. The new type cast variable is given the name "<variable-name>_cast_as_<type>", which is then used in the statement.
    <operator>: one of the following C operators [+ - ^ & | << >>]
    <op-assign>: one of the following C assignment operators [+= -= &= |= ^= <<= >>=]
    <comp>: one of the following C comparator operators [== != <= >= < >]
    <statements>: one or more lines with either C syntax or asm statements
    <label>: an assembly language address label
    <const>: a constant number, either in decimal form or hexadecimal (prefixed by 0x)
        In all cases, a <const> can be used where <ident> is specified, but the reverse is not true

APPENDIX C-continued

Currently supported C constructs are (semicolons are required):
DATA DEFINITIONS

```
typedef struct {
    <ident> <ident>;
    <ident> <ident>: <const>;
    union {
        <ident> <ident>;
        <ident> <ident>: <const>;
    } <ident>;
} <ident>;
```
NOTE: bit field support is limited to dumb substitution of bit field for numeric string within the type
Example: "U8_t name: 1;" effectively becomes "U1_t name;", "U16_t name: 8;" -> "U8_t name;", etc.
If the type does not have a numeric element no action is taken.
ASSIGNMENT <ident> = <ident>;
<ident> <op-assign> <ident>;
<ident> = <ident> <operator> <ident>;
<ident>++;
<ident>--;
COMPARISON <ident> <comp> <ident>
FLOW CONTROL

```
goto <label>;
<label>:
if ( COMPARISON ) goto <label>;
if ( COMPARISON ) {
    <statements>
} else if ( COMPARISON ) {
    <statements>
} else {
    <statements>
}
while ( COMPARISON ) {
    <statements>
}
for ( ASSIGNMENT; COMPARISON; ASSIGNMENT ) {
    <statements>
}
do {
    <statements>
} while ( comparison );
break;
continue;
switch ( <ident> ) {
    case <const>: {
        <statements>
        break;
    }
    default: {
        <statements>
        break;
    }
}
switch ( ( <ident> & <const>) >> <const> ) {
    case <const>: {
        <statements>
        break;
    }
    default: {
        <statements>
        break;
    }
}
```
NOTES:
    The first switch implementation is non-optimal. It jumps to the end of the code section where a jumptable of
    _if <ident> is_eq <casex-ident>, goto <casex-code-label>
    _if <ident> is_eq <casey-ident>, goto <casey-code-label>
        statements is located. When an optional break APPENDIX C-continued is encountered it jumps to the end of the jumptable,
else it falls through (as it should). A jump is always
present prior to the jumptable to bypass it in the case
that all values fall through. The default case is just
an unconditional jump in the jumptable.
    The second switch implementation in the form
of
        switch ( ( <ident> & <ident>) >> <ident> ) {
        is a network processor optimized version that
uses the CASE assembly instruction and generates a jump
table for that statement. Error checking is performed
on all <const> fields to ensure that the values are
within the allowable ranges for the CASE assembly
instruction.
    Note the statement:
    }
    i.e. a (close curly brace) statement must be on a
line by itself and will terminate if/else/while/for/
case/switch blocks. These statements can be nested and
the script maintains the proper context. The
implementation uses jumps to labels that are
automatically generated from the
rootfilename.extension.line_number of the statement
(also .begin/.end/.cont may be used). Additionally,
the assembler keywords "macro" and "mend" are detected
and cause "!" to be added at the end of any auto
generated label if it is created in the macro/mend
block. This should allow the assembler to uniquely
identify each macro label.

The invention claimed is:

1. A method of preparing a software program using a plurality of instructions in an assembly language, the method comprising:
   receiving a definition of a structure expressed as a definition of a first macro comprising at least a first reserved word indicating start of said first macro and a second reserved word indicating end of said first macro;
   receiving a plurality of statements between receipt of the first reserved word and receipt of the second reserved word, each statement defining a member of said structure;
   receiving a first additional statement, at a first location relative to said first reserved word;
   wherein said first additional statement invokes a second macro having as an argument a name of the first macro;
   wherein said second macro checks that said structure hasn't already been defined and increments a first assembler variable indicating total number of structures defined so far;
   receiving a second additional statement, at a second location relative to said second reserved word;
   wherein said second additional statement invokes a third macro having as an argument said name of the first macro;
   wherein said third macro computes a size of said structure and stores said size in a second assembler variable;
   receiving an instantiation of the structure expressed as an invocation of a fourth macro having as an argument a name ("instance name") to be used to identify an instance of said structure, the fourth macro having as another argument a name of the first macro;
   receiving an instruction in an extension of said assembly language, expressed by using the instance name followed by a separator followed by a name of said member in said structure; and
   using an assembler for said assembly language to generate an object code, in response to at least said receivings;
   wherein said assembly language is incapable of supporting structures of the type supported in "C" language; and
   storing the object code in a memory.

2. The method of claim 1 wherein:
   said member is one of (base element type, structure, and union).

3. A method of using macros to support use of structures in a software program to be translated by an assembler that does not support structures, the method comprising:
   receiving a definition of a structure expressed as a definition of a macro ("structure-defining macro") comprising at least a first reserved word indicating start of said structure-defining macro, a second reserved word indicating end of said structure-defining macro, and definition of at least one member in said structure;
   receiving in an instruction that is incapable of translation by said assembler, invocation of another macro ("instantiating macro") to instantiate the structure;
   receiving in said instruction, a name ("instance name") to be used to identify an instance of said structure as an argument for the instantiating macro;
   receiving in said instruction, a name of the structure-defining macro as another argument for the instantiating macro;
   expanding the structure-defining macro in response to receiving the invocation;
   wherein said structure-defining macro computes a size of said structure and stores said size in a first assembler variable;
   checking that said structure hasn't already been defined and storing in a second assembler variable total number of structures defined so far;
   generating an object code by using said assembler, and based on information obtained from said expanding, in response to receiving at least the instance name and a name of the member in the structure; and
   storing the object code in a memory.

4. The method of claim 3 wherein:
   a member of said structure is one of (base element type, structure type, and union type).

5. A computer comprising:
   an assembler incapable of supporting structures of the type supported in the "C" language; and
   a memory encoded with a software program in assembly language extended to support said structures, the software program comprising:
   a definition of a structure expressed as a definition of a macro, in a first assembly language instruction;
   an instantiation of the structure using a name ("instance name"), in a second assembly language instruction;
   use of the instance name, followed by a separator, followed by a name of a member in the structure, in a third assembly language instruction;
   a first plurality of instructions to check that the structure hasn't already been defined and storing total number of structures defined so far in a first assembler variable in memory; and
   a second plurality of instructions to compute a size of said structure and store said size in a second assembler variable in memory.

6. The computer of claim 5 wherein:
   the separator is a period.

7. The method of claim 1 wherein:

said first location is immediately preceding said first reserved word; and said second location is immediately following said second reserved word.

8. The method of claim 1 wherein:

said first location and said second location are between said first reserved word and said second reserved word.

9. A method implemented in a computer, the method comprising:

receiving a first input statement comprising a first preprocessor directive related to beginning of a data structure;

using said first preprocessor directive to convert the first input statement into a first output statement, said first output statement invoking a predetermined macro;

receiving a second input statement comprising a second preprocessor directive;

using said second preprocessor directive to convert the second input statement into a second output statement, said second output statement comprising a first reserved word indicative to an assembler of start of a new macro definition;

receiving a third input statement comprising a third preprocessor directive;

using said third preprocessor directive to convert the third input statement into a third output statement, said third output statement comprising a second reserved word indicative to said assembler of end of said new macro definition;

receiving a fourth input statement comprising a fourth preprocessor directive related to ending of said data structure; and using said fourth preprocessor directive to convert the fourth input statement into a fourth output statement, said fourth output statement invoking another predetermined macro;

using at least one of said statements to check that said data structure hasn't already been defined;

storing total number of structures defined so far in a first memory location;

computing a size of said data structure; and storing said size in a second memory location.

10. The method of claim 9 further comprising:

receiving at least one additional statement after receipt of the second input statement and before receipt of the third input statement.

11. The method of claim 9 wherein:

said one additional statement comprises an additional preprocessor directive related to defining a structure member.

* * * * *

UNITED STATES PATENT AND TRADEMARK OFFICE
CERTIFICATE OF CORRECTION

PATENT NO. : 7,337,438 B1 Page 1 of 1
APPLICATION NO. : 10/404901
DATED : February 26, 2008
INVENTOR(S) : Kris A. Dobbins et al.

It is certified that error appears in the above-identified patent and that said Letters Patent is hereby corrected as shown below:

At Column 1, line 52:

Please delete "ASMC20UT.TXT" and insert --ASMC2OUT.TXT--.

Signed and Sealed this

First Day of July, 2008

JON W. DUDAS
*Director of the United States Patent and Trademark Office*